(12) United States Patent
Mashita et al.

(10) Patent No.: US 12,520,440 B2
(45) Date of Patent: Jan. 6, 2026

(54) COMMUNICATION DEVICE AND COMMUNICATION APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Makoto Mashita, Yokkaichi (JP); Akira Miyajo, Yokkaichi (JP); Masakatsu Moriguchi, Yokkaichi (JP); Takeshi Hagihara, Yokkaichi (JP); Hirofumi Urayama, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 281 days.

(21) Appl. No.: 18/552,530

(22) PCT Filed: Mar. 15, 2022

(86) PCT No.: PCT/JP2022/011542
§ 371 (c)(1),
(2) Date: Sep. 26, 2023

(87) PCT Pub. No.: WO2022/209845
PCT Pub. Date: Oct. 6, 2022

(65) Prior Publication Data
US 2024/0188239 A1   Jun. 6, 2024

(30) Foreign Application Priority Data

Mar. 30, 2021 (JP) .................................. 2021-058103
Jun. 8, 2021 (JP) .................................. 2021-096005

(51) Int. Cl.
*H04B 3/00* (2006.01)
*H04L 25/08* (2006.01)
(Continued)

(52) U.S. Cl.
CPC ......... *H05K 5/0217* (2013.01); *H04L 25/085* (2013.01); *H05K 7/1427* (2013.01)

(58) Field of Classification Search
CPC ...... H05K 5/0217; H05K 7/1427; H05K 1/02; H05K 1/14; H04L 25/085; H04L 25/02
(Continued)

(56) References Cited

U.S. PATENT DOCUMENTS

2019/0386630 A1* 12/2019 Higuchi ................... H03H 7/09
2020/0172028 A1* 6/2020 Kawauchi ........... H04L 25/0276
(Continued)

FOREIGN PATENT DOCUMENTS

JP 2017-079398 A 4/2017

OTHER PUBLICATIONS

LAN (Ethernet) ESD [online], Panasonic Corporation, Industrial, Solution Co., Ltd., Oct. 29, 2018.
(Continued)

*Primary Examiner* — Helene E Tayong
(74) *Attorney, Agent, or Firm* — Honigman LLP

(57) ABSTRACT

A communication device (relay device) is attached to a vehicle power supply apparatus, and receives a differential signal represented by a voltage difference between two electrical signals respectively propagating through two conductive wires included in a communication line. The signal processing circuit removes noise from the two electrical signals using an electric potential of a first conductor as a reference electric potential. The signal conversion unit converts the differential signal represented by the voltage difference between the two electrical signals from which noise
(Continued)

has been removed, into a voltage signal represented by a voltage whose reference electric potential is an electric potential of a second conductor. The power supply circuit of the power supply apparatus applies a voltage whose reference electric potential is the electric potential of the second conductor to the signal conversion unit via the apparatus connector connected to the power supply apparatus.

16 Claims, 31 Drawing Sheets

(51) Int. Cl.
    *H05K 5/02*       (2006.01)
    *H05K 7/14*       (2006.01)

(58) Field of Classification Search
    USPC .......................................................... 375/257
    See application file for complete search history.

(56) References Cited

U.S. PATENT DOCUMENTS

| | | | | |
|---|---|---|---|---|
| 2020/0313724 | A1* | 10/2020 | Mashita | ............... H03H 7/0138 |
| 2023/0119130 | A1* | 4/2023 | Watanabe | ............... H04L 25/02 |
| | | | | 341/150 |

OTHER PUBLICATIONS

International Search Report, Application No. PCT/JP2022/011542, mailed Jun. 21, 2022. ISA/Japan Patent Office.

\* cited by examiner

COMMUNICATION DEVICE AND COMMUNICATION APPARATUS

CROSS-REFERENCE TO RELATED APPLICATIONS

This application is the U.S. national stage of PCT/JP2022/011542 filed on Mar. 15, 2022, which claims priority of Japanese Patent Application No. JP 2021-058103 filed on Mar. 30, 2021, and Japanese Patent Application No. 2021-096005 filed on Jun. 8, 2021, the contents of which are incorporated herein.

TECHNICAL FIELD

The present disclosure relates to a communication device and a communication apparatus.

BACKGROUND

JP 2020-167536A discloses a vehicle communication device that receives a differential signal represented by a voltage difference between two electrical signals respectively propagating through two conductive wires. In this communication device, noise is removed from the two electrical signals using the electric potential of a first conductor as a reference electric potential. Furthermore, the differential signal represented by the voltage difference between the two electrical signals from which noise has been removed is converted into a voltage signal whose reference electric potential is the electric potential of a second conductor.

In the communication device, a voltage whose reference electric potential is the electric potential of the first conductor is applied via a connector. The applied voltage is converted into a voltage whose reference electric potential is the electric potential of the second conductor. The converted voltage is applied to a conversion unit that converts the differential signal into an electric voltage signal. Thereby, power is supplied to the conversion unit.

In the communication device described in JP 2020-167536A, it is necessary to convert the voltage in order to supply power to the conversion unit. For this reason, a circuit element for conversion of voltage is needed. Accordingly, there is a problem in that the manufacturing cost increases.

Accordingly, it is an object of the present disclosure to provide an inexpensive communication device that does not require voltage conversion, and a communication apparatus that includes this communication device.

SUMMARY

A communication device according to an aspect of the present disclosure is a communication device configured to be attached to an in-vehicle apparatus and receive a differential signal represented by a voltage difference between two electrical signals respectively propagating through two conductive wires, the communication device including: a noise removal circuit configured to remove noise from the two electrical signals using an electric potential of a first conductor as a reference electric potential; a signal conversion unit configured to convert a differential signal represented by a voltage difference between the two electrical signals from which the noise removal circuit has removed noise, into a voltage signal represented by a voltage whose reference electric potential is an electric potential of a second conductor; and an apparatus connector configured to be connected to a power supply apparatus for supplying power, in which the power supply apparatus supplies power to the signal conversion unit by applying a voltage whose reference electric potential is the electric potential of the second conductor to the signal conversion unit via the apparatus connector.

A communication apparatus according to an aspect of the present disclosure includes: a communication device configured to receive a differential signal represented by a voltage difference between two electrical signals respectively propagating through two conductive wires; and a vehicle power supply apparatus to which the communication device is to be attached and that is configured to supply power to the communication device, in which the communication device includes: a noise removal circuit configured to remove noise from the two electrical signals using an electric potential of a first conductor as a reference electric potential; a signal conversion unit configured to convert a differential signal represented by a voltage difference between the two electrical signals from which the noise removal circuit has removed noise, into a voltage signal represented by a voltage whose reference electric potential is an electric potential of a second conductor; and an apparatus connector configured to be connected to the power supply apparatus, and the power supply apparatus has a power supply circuit configured to supply power to the signal conversion unit by applying a voltage whose reference electric potential is the electric potential of the second conductor to the signal conversion unit via the apparatus connector.

Advantageous Effects

According to the present disclosure, an inexpensive communication device that does not require voltage conversion is realized.

DETAILED DESCRIPTION OF PREFERRED EMBODIMENTS

Figure 1:
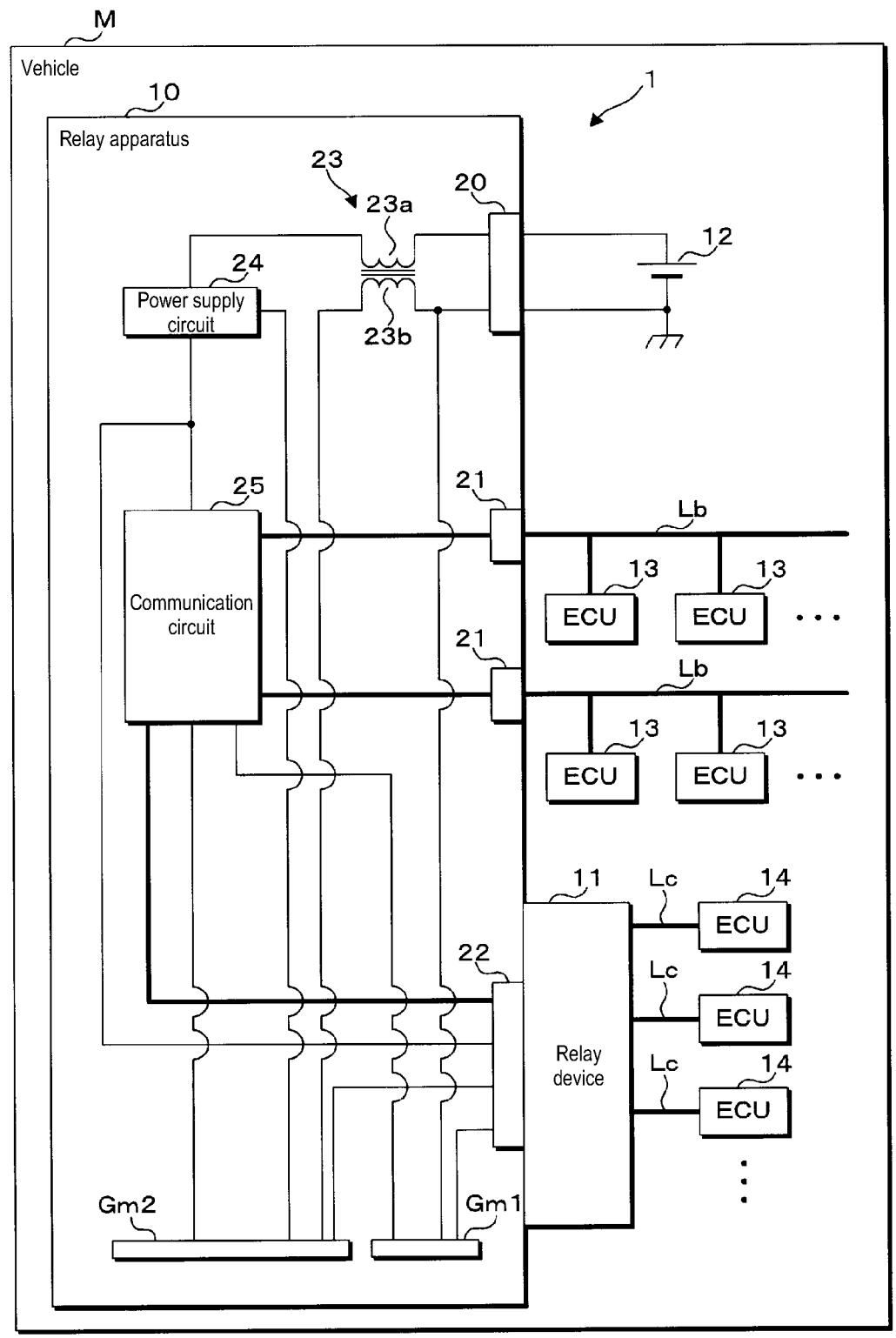
FIG. 1 is a block diagram showing a configuration of a main part of a communication system according to a first embodiment.

First, embodiments of the present disclosure will be listed and described. At least some of the embodiments described below may be combined as appropriate.

A communication device according to one aspect of the present disclosure is a communication device configured to be attached to an in-vehicle apparatus and receive a differential signal represented by a voltage difference between two electrical signals respectively propagating through two conductive wires, the communication device including: a noise removal circuit configured to remove noise from the two electrical signals using an electric potential of a first conductor as a reference electric potential; a signal conversion unit configured to convert a differential signal represented by a voltage difference between the two electrical signals from which the noise removal circuit has removed noise, into a voltage signal represented by a voltage whose reference electric potential is an electric potential of a second conductor; and an apparatus connector configured to be connected to a power supply apparatus for supplying power, in which the power supply apparatus supplies power to the signal conversion unit by applying a voltage whose reference electric potential is the electric potential of the second conductor to the signal conversion unit via the apparatus connector.

In the above aspect, the power supply apparatus applies a voltage whose reference electric potential is the electric potential of the second conductor to the signal conversion unit via the apparatus connection body. For this reason, it is not necessary to convert a voltage whose reference electric potential is the electric potential of the first conductor into a voltage whose reference electric potential is the electric potential of the second conductor. The manufacturing cost is low because no circuit element for voltage conversion is needed.

In a communication device according to one aspect of the present disclosure, the differential signal is a communication signal conforming to an Ethernet (registered trademark) communication protocol, a communication signal using LVDS (Low Voltage Differential Signaling), or a communication signal conforming to USB (Universal Serial Bus).

In the above aspect, a communication signal conforming to the Ethernet communication protocol, a communication signal using LVDS, or a communication signal conforming to USB is received.

A communication device according to an aspect of the present disclosure further includes a conductor connection element configured to be connected between the first conductor and the second conductor, in which the conductor connection element is an inductor, a resistor, or a conductive wire.

In the above aspect, even if the electric potential of the first conductor fluctuates due to noise entering the first conductor, there is little influence on the voltage or electrical signal whose reference electric potential is the electric potential of the second conductor. Similarly, even if the electric potential of the second conductor fluctuates due to noise entering the second conductor, there is little influence on the voltage or electric signal whose reference electric potential is the electric potential of the first conductor.

A communication device according to an aspect of the present disclosure further includes: a substrate on which the first conductor and the second conductor are arranged; a box body that has an open surface and is configured to accommodate the substrate inserted through the open surface; and a rail that is provided in the box body and extends from the open surface toward a bottom surface of the box body.

In the above aspect, the rail is provided inside the box body. For this reason, the substrate can easily be accommodated in the box body by moving the substrate along the rail.

A communication device according to an aspect of the present disclosure further includes a substrate on which the first conductor and the second conductor are arranged, in which the apparatus connector is arranged at an edge portion on one side of the substrate, and the first conductor and the second conductor are arranged side by side along one side of the edge portion where the apparatus connector is arranged.

In the above aspect, connection to the power supply apparatus can be realized regardless of the size of the substrate.

A communication device according to an aspect of the present disclosure further includes a substrate on which the first conductor and the second conductor are arranged, in which the substrate has a circuit surface on which a circuit element is arranged, the apparatus connector is arranged on the substrate and protrudes in a direction perpendicular to the circuit surface, and the power supply apparatus is connected at a leading end of the apparatus connector.

In the above aspect, connection to the power supply apparatus can be realized regardless of the size of the substrate.

A communication device according to an aspect of the present disclosure further includes: a box body that is electrically conductive and is configured to accommodate the substrate; and a protruding portion that protrudes outward from the box body and is used for fixing the box body, in which the protruding portion is electrically conductive and is electrically connected to the first conductor via the box body.

In the above aspect, the protruding portion is connected to the substrate of the power supply apparatus by soldering, for example. This makes it possible to electrically connect the protruding portion to the conductor arranged on the substrate of the power supply apparatus. In this case, the first conductor is electrically connected to the conductor of the substrate of the power supply apparatus via the box body and the protruding portion.

In a communication device according to an aspect of the present disclosure, the protruding portion is provided with a through hole through which an electrically conductive screw is passed, the box body is fixed by tightening the screw, and when the box body is fixed, the screw is electrically connected to the protruding portion.

In the above aspect, the screw is passed through the through hole of the protruding portion. The screw is then tightened, for example, on the substrate of the power supply apparatus. As a result, the screw comes into contact with the conductive protruding portion, and the box body is fixed to the substrate of the power supply apparatus. For example, the screw electrically connects to the conductor in the substrate of the power supply apparatus. In this case, the first conductor is electrically connected to the conductor of the substrate of the power supply apparatus via the box body, the protruding portion, and the screw.

A communication device according to an aspect of the present disclosure further includes a second protruding portion that is electrically conductive, protrudes outward from the box body, and is used for fixing the box, in which the box body includes: a first conductive portion that is electrically conductive and is electrically connected to the first conductor; a second conductive portion that is electrically conductive and is electrically connected to the second conductor; and a coupling portion that has insulating properties and couples the first conductive portion and the second conductive portion to each other, the protruding portion protrudes from the first conductive portion, and the second protruding portion protrudes from the second conductive portion.

In the above aspect, regarding the box body, the first conductive portion is coupled to the second conductive portion by the insulating coupling portion. The protruding portion and the second protruding portion can be respectively electrically connected to the two conductors.

A communication device according to an aspect of the present disclosure further includes: a substrate on which the first conductor and the second conductor are arranged; and a box body that is electrically conductive and is configured to accommodate the substrate, in which the substrate is provided with a second through hole through which a second screw that is electrically conductive is passed, the box body is provided with a screw hole into which the second screw passed through the second through hole is inserted, and when the second screw is tightened in the screw hole, the first conductor is electrically connected to the box body via the second screw.

In the above aspect, the first conductor is electrically connected to the box body via the second screw.

A communication device according to an aspect of the present disclosure further includes a substrate on which the first conductor and the second conductor are arranged, in which the apparatus connector has a conductive rod that is electrically conductive, and the substrate is provided with an insertion hole into which the conductive rod is inserted.

In the above aspect, the conductive rod connects the power supply apparatus and the signal conversion unit. The power supply apparatus supplies power to the signal conversion unit via the conductive rod.

A communication apparatus according to an aspect of the present disclosure includes: a communication device configured to receive a differential signal represented by a voltage difference between two electrical signals respectively propagating through two conductive wires; and a vehicle power supply apparatus to which the communication device is to be attached and that is configured to supply power to the communication device, in which the communication device includes: a noise removal circuit configured to remove noise from the two electrical signals using an electric potential of a first conductor as a reference electric potential; a signal conversion unit configured to convert a differential signal represented by a voltage difference between the two electrical signals from which the noise removal circuit has removed noise, into a voltage signal represented by a voltage whose reference electric potential is an electric potential of a second conductor; and an apparatus connector configured to be connected to the power supply apparatus, and the power supply apparatus has a power supply circuit configured to supply power to the signal conversion unit by applying a voltage whose reference electric potential is the electric potential of the second conductor to the signal conversion unit via the apparatus connector.

In the above aspect, the power supply circuit of the power supply apparatus applies a voltage whose reference electric potential is the electric potential of the second conductor to the signal conversion unit of the communication device via the apparatus connector. For this reason, the communication device does not need to convert a voltage whose reference electric potential is the electric potential of the first conductor into a voltage whose reference electric potential is the electric potential of the second conductor. Since no circuit element for voltage conversion is needed, the manufacturing cost of the communication device is low.

In a communication apparatus according to an aspect of the present disclosure, the power supply apparatus has a power supply conductor, the power supply circuit of the power supply apparatus applies a voltage whose reference electric potential is the electric potential of the power supply conductor, to the signal conversion unit via the apparatus connector, and the second conductor is connected to the power supply conductor via the apparatus connector.

In the above aspect, the second conductor of the communication device is connected to the power supply conductor of the power supply apparatus via the apparatus connector. Accordingly, the electric potential of the second conductor is the same as the electric potential of the power supply conductor.

In a communication apparatus according to an aspect of the present disclosure, the power supply apparatus includes: a second power supply conductor; and a voltage conversion unit configured to convert a voltage whose reference electric potential is the electric potential of the second power supply conductor, into a voltage whose reference electric potential is the electric potential of the power supply conductor, and the first conductor is connected to the second power supply conductor via the apparatus connector.

In the above aspect, the first conductor of the communication device is connected to the second power supply conductor of the power supply apparatus via the apparatus connector. The second conductor of the communication device is connected to the power supply conductor of the power supply apparatus via the apparatus connector. The voltage conversion unit of the power supply apparatus converts a voltage whose reference electric potential is the electric potential of the second power supply conductor into a voltage whose reference electric potential is the electric potential of the power supply conductor. The power supply circuit of the power supply apparatus applies a voltage whose reference electric potential is the electric potential of the power supply conductor to the signal conversion unit of the communication device via the apparatus connector.

In a communication apparatus according to an aspect of the present disclosure, the power supply apparatus has a power supply conductor and a second power supply conductor, the power supply conductor and the second power supply conductor are respectively connected to the second conductor and the first conductor, and the power supply conductor and the second power supply conductor are connected by an inductor, a resistor, or a second conductive wire.

In the above aspect, the second conductive wire has a resistance component. The power supply conductor and the second power supply conductor are connected by an inductor, a resistor, or the second conductive wire. Accordingly, even if the electric potential of the power supply conductor fluctuates due to noise entering the power supply conductor, there is little influence on the voltage or electrical signal whose reference electric potential is the electric potential of the second power supply conductor. Similarly, even if the electric potential of the second power supply conductor fluctuates due to noise entering the second power supply conductor, there is little influence on the voltage or electric signal whose reference electric potential is the electric potential of the power supply conductor.

In a communication apparatus according to an aspect of the present disclosure, the communication device transmits data included in the voltage signal converted by the signal conversion unit to the power supply apparatus via the apparatus connector.

In the above aspect, the power supply apparatus receives data from the communication device.

A specific example of a communication system according to an embodiment of the present disclosure will be described below with reference to the drawings. Note that the present disclosure is not limited to these examples, but is indicated by the scope of the claims, and all modifications within the meaning and range of equivalency to the scope of the claims are intended to be encompassed therein.

First Embodiment

Configuration of Communication System

FIG. 1 is a block diagram showing a configuration of a main part of a communication system 1 according to a first embodiment. The communication system 1 is mounted in a vehicle M. The communication system 1 includes a relay apparatus 10, a relay device 11, a DC power supply 12, and a plurality of ECUs (Electronic Control Units) 13, 14. The relay apparatus 10 is, for example, an ECU. The relay device 11 includes, for example, an integrated circuit element. The DC power supply 12 is, for example, a battery. The relay apparatus 10 has a power supply connector 20, two bus connectors 21, and a device connector 22. In FIG. 1, thick lines indicate signal lines through which signals propagate. Wiring different from the signal lines is indicated by thin lines.

A positive electrode and a negative electrode of the DC power supply 12 are separately connected to the power supply connector 20 of the relay apparatus 10. The negative electrode of the DC power supply 12 is further grounded. Grounding is realized by connecting to the body of the vehicle M, for example. A communication bus Lb is connected to each of the two bus connectors 21 of the relay apparatus 10. A plurality of ECUs 13 are connected to each communication bus Lb. The relay device 11 is connected to the device connector 22 of the relay apparatus 10. The relay device 11 is connected to the plurality of ECUs 14 by communication lines Lc.

The relay device 11 is attached to the device connector 22 of the relay apparatus 10. As a result, the relay device 11 is connected to the device connector 22. The DC power supply 12 supplies power to the relay apparatus 10. The relay apparatus 10 supplies power to the relay device 11. The relay apparatus 10 functions as a power supply apparatus and an in-vehicle apparatus. The relay apparatus 10 and the relay device 11 perform various processes using the supplied power. The relay apparatus 10 and the ECUs 13 transmit differential signals including data via the communication buses Lb. Transmission of differential signals corresponds to transmission of data. The communication buses Lb each include two conductive wires. A differential signal is represented by the voltage difference between two electrical signals respectively propagating through the two conductors. A differential signal transmitted via a communication bus Lb is received by all devices connected to the communication bus Lb.

Each of the ECUs 13, 14 is connected to an actuator and a sensor (not shown). Each of the ECUs 13, 14 acquires the detection result detected by the sensor. Each of the ECUs 13, 14 outputs an operation signal to the actuator. The operation signal indicates the operation of the actuator. When an operation signal is input, the actuator performs the operation indicated by the input operation signal. Each of the ECUs 13, 14 controls the operation of the actuator by outputting an operation signal to the actuator. The actuator is a door motor for locking and unlocking a door, a wiper motor for swinging a wiper, a lamp, or the like.

When an ECU 13 receives a differential signal via the communication bus Lb, the ECU 13 determines whether or not the destination of the data included in the received differential signal is the ECU 13. When the ECU 13 determines that the data transmission destination is the ECU 13, the ECU 13 controls the operation of the actuator based on the data of the received differential signal. The ECU 13 transmits a differential signal including data indicating the detection result detected by the sensor via the communication bus Lb. The transmission destination of the data included in the differential signal is an ECU 13 different from the transmission source or an ECU 14.

When the relay apparatus 10 receives a differential signal via the communication bus Lb, the relay apparatus 10 determines whether or not to relay transmission of the data based on the transmission destination of the data included in the received differential signal. When the relay apparatus 10 determines that transmission of the data is to be relayed, the relay apparatus 10 performs at least one of two processes. The first process is transmission of the differential signal via a communication bus Lb different from the communication bus Lb used for receiving the differential signal. The second process is transmission of a voltage signal including the data to the relay device 11. A voltage signal is a signal represented by a voltage whose reference electric potential is the electric potential of a conductor. Transmission of a voltage signal also corresponds to transmission of data.

When the relay device 11 receives a voltage signal from the relay apparatus 10, the relay device 11 generates a differential signal including the data of the received voltage signal. The relay device 11 transmits the generated differential signal to an ECU 14 via a communication line Lc. Like the communication bus Lb, the communication line Lc includes two conductors Wa, Wb (see FIG. 3). A differential signal is represented by the voltage difference between the two electrical signals respectively propagating through the two conductors Wa, Wb.

The ECU 14 transmits, for example, a differential signal including data indicating the detection result detected by the sensor to the relay device 11 via the communication line Lc. The transmission destination of the data included in the differential signal is an ECU 13 or an ECU 14 different from the transmission source. The relay device 11 receives the differential signal. The relay device 11 functions as a communication device. An apparatus including the relay apparatus 10 and the relay device 11 functions as a communication apparatus.

When the relay device 11 receives the differential signal from the ECU 14 and the transmission destination of the data included in the received differential signal is an ECU 14 different from the transmission source, the relay device 11 transmits a differential signal including the data to the ECU 14 that is the transmission destination.

When the ECU 14 receives the differential signal via the communication line Lc, the ECU 14 controls the actuator based on the data included in the received differential signal.

When the relay device 11 receives the differential signal from the ECU 14 and the transmission destination of the data included in the received differential signal is the ECU 13, the relay device 11 transmits the voltage signal including the data of the received differential signal to the relay apparatus 10. When the relay apparatus 10 receives the voltage signal from the relay device 11, the relay apparatus 10 transmits a differential signal including the data of the received voltage signal to the ECU 13 via the communication bus Lb.

As described above, the relay apparatus 10 relays communication of data between two ECUs 13 respectively connected to two mutually different communication buses Lb. The relay device 11 relays communication of data between two ECUs 14. The relay apparatus 10 and the relay device 11 relay communication between the ECUs 13, 14.

Communication via the communication bus Lb is performed, for example, according to a CAN (Controller Area Network) communication protocol. Communication via the communication line Lc is performed, for example, according to the Ethernet (registered trademark) communication protocol.

Configuration of Relay Apparatus 10

In addition to the power supply connector 20, the two bus connectors 21, and the device connector 22, the relay apparatus 10 includes a common mode choke coil 23, a power supply circuit 24, a communication circuit 25, a first main conductor Gm1, and a second main conductor Gm2. The common mode choke coil 23 has a first inductor 23a, a second inductor 23b, and an annular magnetic body (not shown). The first inductor 23a and the second inductor 23b are wound around a magnetic material. The electric potential of each of the first main conductor Gm1 and the second main conductor Gm2 functions as ground. The first main conductor Gm1 functions as a second power supply conductor. The second main conductor Gm2 functions as a power supply conductor.

The ends on one side of the first inductor 23a and the second inductor 23b are separately connected to the power supply connector 20. A connection node between the second inductor 23b and the power supply connector 20 is connected to the first main conductor Gm1. The end on the other side of the first inductor 23a is connected to the power supply circuit 24. The end on the other side of the second inductor 23b and the power supply circuit 24 are separately connected to the second main conductor Gm2.

As described above, the second inductor 23b connects the first main conductor Gm1 and the second main conductor Gm2. The circuit element connecting the first main conductor Gm1 and the second main conductor Gm2 is not limited to the second inductor 23b, and may be a resistor, for example. In this case, the power supply connector 20 is connected to the power supply circuit 24 without going through the first inductor 23a.

The power supply circuit 24 is further connected to the device connector 22 and the communication circuit 25. The communication circuit 25 is further connected to the two bus connectors 21, the device connector 22, the first main conductor Gm1, and the second main conductor Gm2, separately. The first main conductor Gm1 and the second main conductor Gm2 are connected to the device connector 22 separately.

A voltage whose reference electric potential is the electric potential of the first main conductor Gm1 is applied from the DC power supply 12 to the ends on one side of the first inductor 23a and the second inductor 23b of the common mode choke coil 23. The common mode choke coil 23 removes common mode noise from the applied voltage. Common mode noise is noise that is superimposed in-phase on two conductive wires connected to the ends on one side of the first inductor 23a and the second inductor 23b.

The common mode choke coil 23 applies a voltage from which common mode noise has been removed, from the other end of the first inductor 23a to the power supply circuit 24. As described above, the other end of the second inductor 23b and the power supply circuit 24 are connected to the second main conductor Gm2. For this reason, the voltage applied to the power supply circuit 24 by the common mode choke coil 23 is a voltage whose reference electric potential is the electric potential of the second main conductor Gm2.

As described above, the common mode choke coil 23 converts a voltage whose reference electric potential is the electric potential of the first main conductor Gm1, into a voltage whose reference electric potential is the electric potential of the second main conductor Gm2. The common mode choke coil 23 functions as a voltage conversion unit.

The power supply circuit 24 steps down the voltage applied from the common mode choke coil 23 to a constant voltage such as 5 V or 3.3 V. The power supply circuit 24 applies the constant voltage generated by stepping down the voltage, to the relay device 11 via the device connector 22. The power supply circuit 24 further applies the generated constant voltage to the communication circuit 25. Thus, power is supplied to the relay device 11 and the communication circuit 25. The reference electric potential for the constant voltage is the electric potential of the second main conductor Gm2.

When the communication circuit 25 receives a differential signal via the communication bus Lb, the communication circuit 25 uses the electric potential of the first main conductor Gm1 as a reference electric potential to remove noise from the two electrical signals forming the received differential signal. The communication circuit 25 converts the differential signal represented by the voltage difference between the two electrical signals from which noise has been removed, into a voltage signal whose reference electric potential is the electric potential of the second main conductor Gm2. The communication circuit 25 acquires the data included in the converted voltage signal.

The communication circuit 25 determines whether or not to relay transmission of the data based on the transmission destination of the acquired data. When the communication circuit 25 determines that transmission of the data is to be relayed, the communication circuit 25 performs at least one of the two processes described above. The first process described above is transmission of the differential signal via a communication bus Lb different from the communication bus Lb used for receiving the differential signal. The second process is transmission of a voltage signal including the data to the relay device 11.

In the first process, the communication circuit 25 generates a differential signal including the acquired data, and transmits the generated differential signal to a communication bus Lb different from the communication bus Lb used for receiving the differential signal. In the second process, the communication circuit 25 transmits a voltage signal including the acquired data to the relay device 11. As described above, when the relay device 11 receives the voltage signal from the communication circuit 25, the relay device 11 generates a differential signal including the data of the received voltage signal. The relay device 11 transmits the generated differential signal to the ECU 14.

As described above, the communication circuit 25 performs processing of the electrical signal using the electric potential of the first main conductor Gm1 as a reference electric potential and processing of the electrical signal using the electric potential of the second main conductor Gm2 as a reference electric potential.

As described above, the relay apparatus 10 has the first main conductor Gm1 and the second main conductor Gm2. Accordingly, even if the electric potential of the first main conductor Gm1 fluctuates due to noise entering the first main conductor Gm1, there is little influence on the voltage or electrical signal whose reference electric potential is the electric potential of the second main conductor Gm2. Similarly, even if the electric potential of the second main conductor Gm2 fluctuates due to noise entering the second main conductor Gm2, there is little influence on the voltage or signal whose reference electric potential is the electric potential of the first main conductor Gm1.

Note that the number of ECUs 13 connected to one communication bus Lb may also be one. Also, the number of communication buses Lb connected to the relay apparatus 10 is not limited to two, and may be one or three or more. The number of bus connectors 21 of the relay apparatus 10 is adjusted to the same number as the number of communication buses Lb. If there is one communication bus Lb, the relay apparatus 10 does not relay communication between two ECUs 13.

Configuration of Relay Device 11

Figure 2:
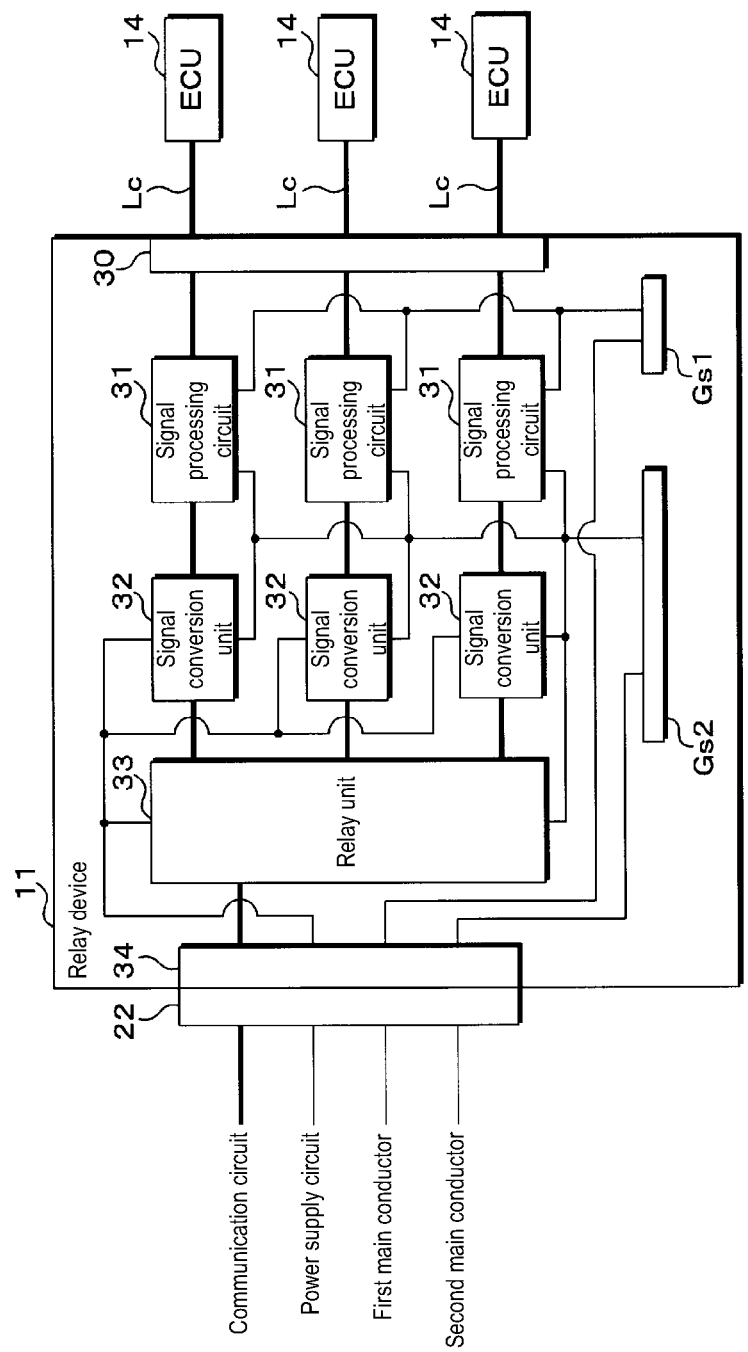
FIG. 2 is a block diagram showing a configuration of a main part of a relay device.

FIG. 2 is a block diagram showing a configuration of a main part of the relay device 11. FIG. 2 shows an example in which the number of ECUs 14 is three. There is no problem as long as the number of ECUs 14 connected to the relay device 11 is one or more. Accordingly, the number of ECUs 14 is not limited to three. In FIG. 2 as well, signal lines are indicated by thick lines in the same manner as in FIG. 1. Wiring different from the signal lines is indicated by thin lines.

As shown in FIG. 2, the relay device 11 includes a communication line connector 30, three signal processing circuits 31, three signal conversion units 32, a relay unit 33, an apparatus connector 34, a first sub-conductor Gs1, and a second sub-conductor Gs2. The ends on one side of the three communication lines Lc are separately connected to the communication line connector 30. As described above, the communication lines Lc each include two conductors Wa, Wb. The ends on the other side of the communication lines Lc are connected to the ECUs 14. The apparatus connector 34 is connected to the device connector 22 of the relay apparatus 10. The electric potential of each of the first sub-conductor Gs1 and the second sub-conductor Gs2 functions as ground.

The communication line connector 30 is individually connected to three signal processing circuits 31. The three signal processing circuits 31 are respectively connected to the three signal conversion units 32. The three signal conversion units 32 are further connected to the relay unit 33 separately. The three signal conversion units 32 and the relay unit 33 are further connected to the apparatus connector 34. The apparatus connector 34 is further connected to the first sub-conductor Gs1 and the second sub-conductor Gs2. Each of the three signal processing circuits 31 is separately connected to the first sub-conductor Gs1 and the second sub-conductor Gs2. The three signal conversion units 32 and the relay unit 33 are further connected to the second sub-conductor Gs2.

As described above, the relay apparatus 10 has the power supply circuit 24, the communication circuit 25, the first main conductor Gm1, and the second main conductor Gm2. The apparatus connector 34 of the relay device 11 is connected to the device connector 22 of the relay apparatus 10. The communication circuit 25 is connected to the relay unit 33 via the device connector 22 and the apparatus connector 34. The power supply circuit 24 is connected to the three signal conversion units 32 and the relay unit 33 via the device connector 22 and the apparatus connector 34. The first main conductor Gm1 is connected to the first sub-conductor Gs1 via the device connector 22 and the apparatus connector 34. The second main conductor Gm2 is connected to the second sub-conductor Gs2 via the device connector 22 and the apparatus connector 34.

Note that the number of signal processing circuits 31 and the number of signal conversion units 32 are the same as the number of ECUs 14. Accordingly, when the number of ECUs 14 is not three, the number of signal processing circuits 31 and the number of signal conversion units 32 are adjusted to the same number as the number of ECUs 14.

As described above, the power supply circuit 24 applies to the relay device 11 a constant voltage whose reference electric potential is the electric potential of the second main conductor Gm2. The second main conductor Gm2 is connected to the second sub-conductor Gs2. For this reason, the electric potential of the second main conductor Gm2 is the same as the electric potential of the second sub-conductor Gs2. The power supply circuit 24 applies a constant voltage whose reference electric potential is the electric potential of the second sub-conductor Gs2 to the signal conversion unit 32 and the relay unit 33 via the apparatus connector 34. As a result, power is supplied to the signal conversion unit 32 and the relay unit 33.

As described above, the ECU 14 transmits a differential signal via the communication line Lc. In the relay device 11, the differential signal is input to a signal processing circuit 31 via the communication line Lc and the communication line connector 30. The signal processing circuit 31 uses the electric potential of the first sub-conductor Gs1 as a reference electric potential to remove noise from the two electrical signals constituting the differential signal input via the communication line Lc and the communication line connector 30. Here, the noise to be removed is, for example, electrostatic noise that is superimposed on the signal when static electricity is generated. When electrostatic noise is superimposed on an electrical signal, the voltage of the electrical signal temporarily rises significantly. The first sub-conductor Gs1 functions as a first conductor. The signal processing circuit 31 functions as a noise removal circuit.

The signal processing circuit 31 removes common mode noise from a differential signal constituted by two electrical signals from which noise has been removed. Common mode noise is noise that is superimposed in-phase on the two conductors included in the communication line Lc. The signal processing circuit 31 uses the electric potential of the second sub-conductor Gs2 as a reference electric potential to remove noise from the two electrical signals constituting the differential signal from which common mode noise has been removed. The noise to be removed here is, for example, electrostatic noise.

The signal processing circuit 31 outputs to the signal conversion unit 32 a differential signal represented by the voltage difference between the two electrical signals from which noise has been removed. As a result, the signal conversion unit 32 receives the differential signal. The signal conversion unit 32 converts the received differential signal into a voltage signal represented by a voltage whose reference electric potential is the electric potential of the second sub-conductor Gs2.

The second sub-conductor Gs2 functions as a second conductor. The signal conversion unit 32 outputs the converted voltage signal to the relay unit 33. The relay unit 33 acquires data included in the input voltage signal.

When the transmission destination of the acquired data is an ECU 13, the relay unit 33 generates a voltage signal including the acquired data. Here, the reference electric potential of the voltage signal is the electric potential of the second sub-conductor Gs2 (second main conductor Gm2). The relay unit 33 transmits the generated voltage signal to the communication circuit 25 via the apparatus connector 34 and the device connector 22. Thereby, the communication circuit 25 receives data from the relay unit 33.

When the transmission destination of the acquired data is an ECU 14, the relay unit 33 generates a voltage signal including the acquired data. Here as well, the reference electric potential of the voltage signal is the electric potential of the second sub-conductor Gs2. The relay unit 33 outputs the generated voltage signal to a signal conversion unit 32.

The communication circuit 25 transmits to the relay unit 33 a voltage signal whose reference electric potential is the electric potential of the second main conductor Gm2 (second sub-conductor Gs2). When the relay unit 33 receives the voltage signal, the relay unit 33 acquires the data of the received voltage signal. The relay unit 33 generates a voltage signal including the acquired data, and outputs the generated voltage signal to the signal conversion unit 32.

When a voltage signal is input from the relay unit 33, the signal conversion unit 32 converts the input voltage signal into a differential signal. The signal conversion unit 32 transmits the converted differential signal to the ECU 14 via the signal processing circuit 31 and the communication line connector 30.

As described above, the power supply circuit 24 of the relay apparatus 10 applies a constant voltage, whose reference electric potential is the electric potential of the second sub-conductor Gs2, to the signal conversion unit 32 and the relay unit 33 of the relay device 11 via the apparatus connector 34. For this reason, in the relay device 11, it is not necessary to convert the voltage whose reference electric potential is the first sub-conductor Gs1 into the voltage whose reference electric potential is the second sub-conductor Gs2. Since no circuit element for converting voltage is required, the manufacturing cost of the relay device 11 is low.

The differential signal transmitted via the communication line Lc is a communication signal conforming to the Ethernet (registered trademark) communication protocol, a communication signal using LVDS (Low Voltage Differential Signaling), or a communication signal conforming to USB (Universal Serial Bus).

In communication conforming to the Ethernet communication protocol, communication using LVDS, or communication conforming to USB, signals are transmitted and received in a P2P (peer-to-peer) format. For this reason, the amount of data that can be transmitted per unit time is large. If the P2P (peer-to-peer) format is adopted, it is difficult to increase the number of ECUs 14 when the ECUs 14 are directly connected to the relay apparatus. However, the relay device 11 is connected to the relay apparatus 10. For this reason, by replacing the current relay device 11 with another relay device 11, the number of ECUs 14 can be easily increased or reduced.

Communication in which differential signals are transmitted includes communication conforming to the CAN (Controller Area Network) communication protocol. In this communication, ECUs are connected to communication buses. For this reason, it is possible to easily increase and reduce the number of ECUs. However, since it is not a P2P format, the amount of data that can be transmitted per unit time is small.

If the ECUs 14 are directly connected to the relay apparatus, it is difficult to increase or reduce the number of ECUs 14 after manufacturing the relay apparatus. It is assumed that a sensor is newly installed in the vehicle after the relay apparatus is manufactured. In this case, it may be necessary to transmit the detection result detected by the sensor from one ECU 14 to an ECU 13 or another ECU 14. In this case, it is necessary to increase the number of ECUs 14 connected to the relay apparatus. However, since the ECUs 14 are directly connected to the relay apparatus, it is necessary to newly manufacture the relay apparatus.

However, in the communication system 1, by replacing the current relay device 11 with another relay device 11, it is possible to easily add an ECU 14 that transmits sensor detection values. Also, the relay device 11 can be replaced. For this reason, depending on the situation of the vehicle M, a relay device 11 can be attached to each of a plurality of relay apparatuses 10 having mutually different functions.

Configuration of Signal Processing Circuit 31

Figure 3:
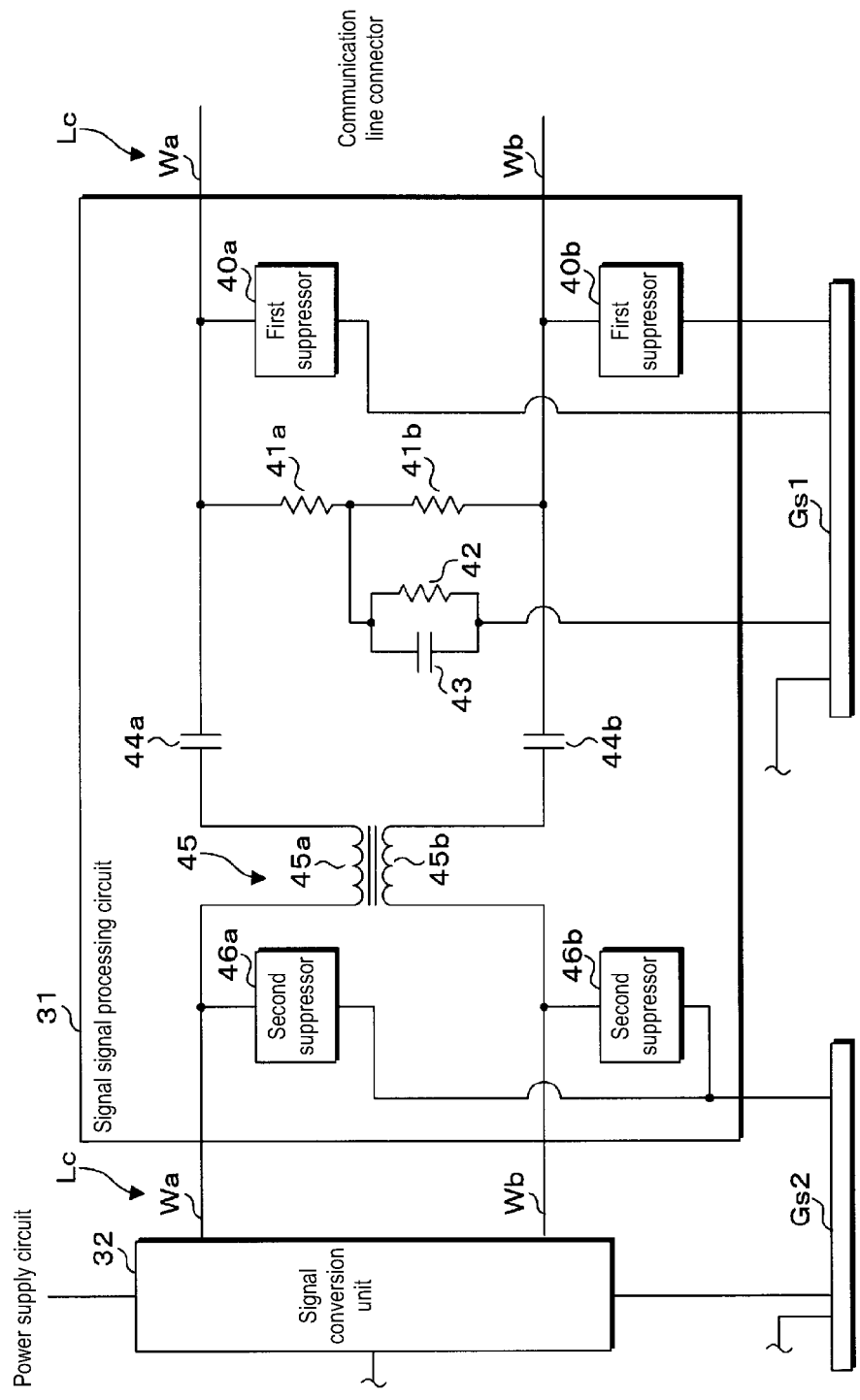
FIG. 3 is a circuit diagram of a signal processing circuit.

FIG. 3 is a circuit diagram of the signal processing circuit 31. The signal processing circuit 31 includes two first suppressors 40a, 40b, three resistors 41a, 41b, 42, three capacitors 43, 44a, 44b, a common mode choke coil 45, and two second suppressors 46a, 46b. The common mode choke coil 45 has a first inductor 45a, a second inductor 45b and an annular magnetic body. The first inductor 45a and the second inductor 45b are each wound around a magnetic material.

As described above, the communication line Lc includes the two conductive wires Wa, Wb. The capacitor 44a and the first inductor 45a of the common mode choke coil 45 are arranged at an intermediate portion of the conductive wire Wa. The capacitor 44a is arranged on the communication line connector 30 side of the first inductor 45a. Similarly, the capacitor 44b and the second inductor 45b of the common mode choke coil 45 are arranged at an intermediate portion of the conductive wire Wb. The capacitor 44b is arranged on the communication line connector 30 side of the second inductor 45b.

The ends on one side of the first suppressor 40a and the resistor 41a are connected to the conductive wire Wa on the communication line connector 30 side of the capacitor 44a. The connection point of the first suppressor 40a is located on the communication line connector 30 side relative to the connection point of the resistor 41a. Similarly, the ends on one side of the first suppressor 40b and the resistor 41b are connected to the conductive wire Wb on the communication line connector 30 side of the capacitor 44b. The connection point of the first suppressor 40b is located on the communication line connector 30 side relative to the connection point of the resistor 41b.

The other end of resistor 41a is connected to the other end of resistor 41b. A connection node between the resistors 41a, 41b is connected to the ends on one side of the resistor 42 and the capacitor 43. The ends on the other side of the first suppressors 40a, 40b, the resistor 42, and the capacitor 43 are connected to the first sub-conductor Gs1.

The one end of the second suppressor 46a is connected to the conductive wire Wa on the signal conversion unit 32 side of the first inductor 45a. Similarly, the one end of the second suppressor 46b is connected to the conductive wire Wb on the signal conversion unit 32 side of the second inductor 45b. The ends on the other side of the second suppressors 46a, 46b are connected to the second sub-conductor Gs2.

Each of the first suppressors 40a, 40b includes a suppressor, a varistor, a capacitor, or the like. The first suppressors 40a, 40b suppress the peak values of the two electrical signals whose reference electric potential is the electric potential of the first sub-conductor Gs1. As described above, there is a possibility that the peak values of the electrical signals will temporarily rise significantly due to superimposition of noise. Suppression of the peak values removes electrostatic noise from the electrical signals. The two electrical signals respectively propagate through the two conductive wires Wa, Wb. The first suppressors 40a, 40b suppress the peak values of the two electrical signals constituting the differential signal input from the communication line connector 30.

The resistors 41a, 41b, 42, and the capacitor 43 function as a termination circuit and suppress reflection of differential signals input from the communication line connector 30 side.

The capacitors 44a, 44b remove the DC components of the two electrical signals constituting the differential signal input from the communication line connector 30 side. The capacitors 44a, 44b output to the common mode choke coil 45 a differential signal represented by a voltage difference between the two electrical signals from which DC components have been removed.

The common mode choke coil 45 removes common mode noise from the differential signal output by the capacitors 44a, 44b, and outputs the differential signal from which the common mode noise has been removed to the signal conversion unit 32 side.

Each of the second suppressors 46a, 46b includes a suppressor, a varistor, a capacitor, a Zener diode, a diode clamp circuit, or the like. The second suppressors 46a, 46b suppress the peak values of the two electric signals whose reference electric potential is the electric potential of the second sub-conductor Gs2. This removes noise from the two electrical signals. The noise to be removed is, for example, electrostatic noise. The two electrical signals respectively propagate through the two conductive wires Wa, Wb. The second suppressors 46a, 46b suppress the peak values of the two electrical signals constituting the differential signal input from the common mode choke coil 45. A differential signal constituted by two electrical signals with suppressed peak values is input to the signal conversion unit 32.

As described above, the signal conversion unit 32 transmits a differential signal via the communication line Lc. In this case, the second suppressors 46a, 46b suppress the peak values of the two electrical signals constituting the differential signal input from the signal conversion unit 32. This removes noise from the two electrical signals. A differential signal constituted by two electrical signals with suppressed peak values is input to the common mode choke coil 45. The common mode choke coil 45 removes common mode noise from the differential signal input from the signal conversion unit 32 side, and outputs the differential signal from which the common mode noise has been removed to the communication line connector 30 side.

The capacitors 44a, 44b remove the DC components of the two electrical signals constituting the differential signal input from the signal conversion unit 32 side. The capacitors 44a, 44b output to the communication line connector 30 side a differential signal represented by the voltage difference between the two electrical signals from which the DC component has been removed. The first suppressors 40a, 40b suppress the peak values of the two electrical signals constituting the differential signal output by the capacitors 44a, 44b. This removes noise from the two electrical signals. A differential signal constituted by the two electrical signals whose peak values are suppressed is output to the ECU 14 via the communication line connector 30.

As described above, the signal processing circuit 31 removes noise from two electrical signals using the electric potential of the first sub-conductor Gs1 as a reference electric potential. The signal processing circuit 31 removes noise from the two electrical signals using the electric potential of the second sub-conductor Gs2 as a reference electric potential.

As mentioned above, the relay device 11 has the first sub-conductor Gs1 and the second sub-conductor Gs2. Accordingly, even if the electric potential of the first sub-conductor Gs1 fluctuates due to noise entering the first sub-conductor Gs1, there is little influence on the voltage or signal whose reference electric potential is the electric potential of the second sub-conductor Gs2. Similarly, even if the electric potential of the second sub-conductor Gs2 fluctuates due to noise entering the second sub-conductor Gs2, there is little influence on the voltage or signal whose reference electric potential is the electric potential of the first sub-conductor Gs1. The noise input to the first sub-conductor Gs1 is output to the outside of the relay apparatus 10 via the first main conductor Gm1 and the power supply connector 20. Note that the signal processing circuit 31 may also not include the two second suppressors 46a, 46b.

Appearance and Internal Structure of Relay Apparatus 10 and Relay Device 11

Figure 4:
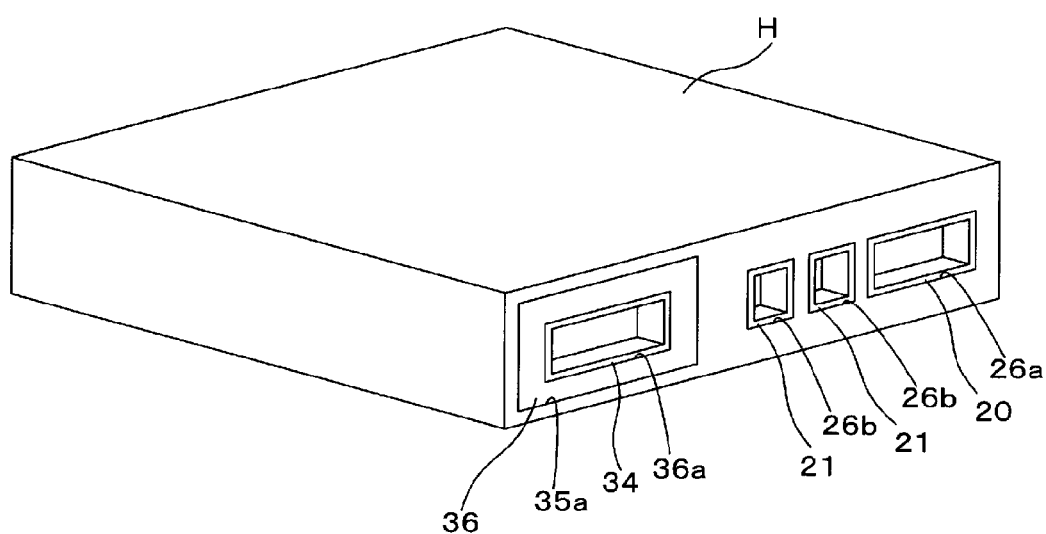
FIG. 4 is a perspective view of a relay apparatus and a relay device.
Figure 5:
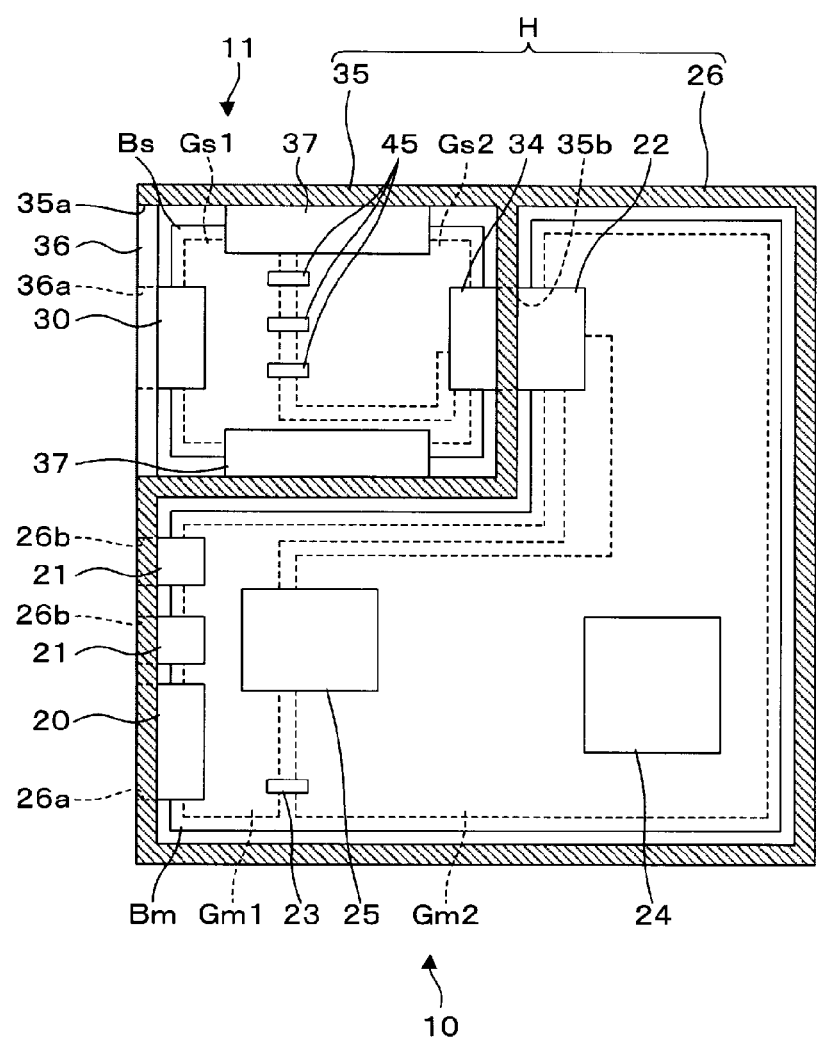
FIG. 5 is a cross-sectional view of a relay apparatus and a relay device.

FIG. 4 is a perspective view of the relay apparatus 10 and the relay device 11. FIG. 5 is a cross-unital view of the relay apparatus 10 and the relay device 11. FIGS. 4 and 5 show an example in which the number of bus connectors 21 is two. As shown in FIG. 5, the relay apparatus 10 further has an apparatus box body 26. The relay device 11 also has a device box body 35. The apparatus box body 26 and the device box body 35 are formed in one piece. The apparatus box body 26 and the device box body 35 constitute an accommodation box H.

The accommodation box H has a hollow cuboid shape. The space inside the accommodation box H is divided into two spaces by a partition plate extending in the up-down direction. The upper and lower sides of FIG. 4 correspond to the upper and lower sides of the relay apparatus 10 and the relay device 11, respectively. As shown in FIGS. 4 and 5, the device box body 35 also has a hollow cuboid shape. The left wall of the device box body 35 is a part of the partition plate and protrudes rearward from the front wall of the accommodation box H. The rear wall of the device box body 35 is a part of the partition plate, and protrudes leftward from the right wall of the accommodation box H. The left wall of the device box body 35 is coupled to the rear wall. The left and rear walls of the device box body 35 are part of the apparatus box body 26.

Note that the front sides and the rear sides of the relay apparatus 10 and the relay device 11 respectively correspond to the left side and the right side in FIG. 5. Similarly, the right sides and the left sides of the relay apparatus 10 and the relay device 11 respectively correspond to the upper side and the lower side in FIG. 5.

As shown in FIGS. 4 and 5, the front wall of the apparatus box body 26 is provided with an opening 26a and a plurality of openings 26b formed therethrough in the front-rear direction. The openings 26a, 26b each have a rectangular shape. The power supply connector 20 of the relay apparatus 10 has a cuboid shape and is fitted into the opening 26a. The front surface of the power supply connector 20 is provided with a recess that is recessed rearward. The end of a cable including two conductive wires connected to the positive and negative electrodes of the DC power supply 12 is inserted into the recess of the power supply connector 20, for example. Thereby, the positive and negative electrodes of the DC power supply 12 are separately connected to the common mode choke coil 23.

The bus connector 21 of the relay apparatus 10 has a cuboid shape and is fitted into the opening 26b. The front surface of the bus connector 21 is provided with a recess that is recessed rearward. For example, the end of the communication bus Lb is inserted into the recess of the bus connector 21. The communication bus Lb is thereby connected to the communication circuit 25.

The front wall of the device box body 35 is provided with a rectangular opening 35a formed therethrough in the front-rear direction. Accordingly, the device box body 35 has an open face. The opening 35a is closed by a lid 36 having a rectangular plate shape. The main surface of the lid 36 is aligned with the front surface of the accommodation box H. The main surface of a plate is the wide surface and is different from the end surfaces. The lid 36 is provided with a rectangular opening 36a formed therethrough in the front-rear direction. The communication line connector 30 has a cuboid shape and is fitted into the opening 36a. The front surface of the communication line connector 30 is provided with a recess that is recessed rearward. For example, the end of a cable including a plurality of communication lines Lc is inserted into the recess of the communication line connector 30. The communication bus Lb is thereby connected to the signal processing circuit 31.

The relay apparatus 10 has a main substrate Bm. FIG. 5 shows the plane of the main substrate Bm. As shown in FIG. 5, the main substrate Bm is accommodated in the apparatus box body 26. When the main substrate Bm is viewed from above, the main substrate Bm is L-shaped. The first main conductor Gm1 and the second main conductor Gm2 are arranged inside the main substrate Bm. The first main conductor Gm1 and the second main conductor Gm2 each have a plate shape. The first main conductor Gm1 is spaced apart from the second main conductor Gm2. The upper and lower surfaces of the main substrate Bm, the first main conductors Gm1, and the second main conductors Gm2 are main surfaces.

The power supply connector 20, the plurality of bus connectors 21, the device connector 22, the common mode choke coil 23, the power supply circuit 24, and the communication circuit 25 are arranged on the upper surface of the main substrate Bm. The power supply connector 20 and the plurality of bus connectors 21 are arranged near the front wall of the apparatus box body 26. The device connector 22 is arranged near the rear wall of the device box body 35. The device connector 22 has a cuboid shape. The front surface of the device connector 22 opposes the rear surface of the device box body 35. The arrangement of the power supply circuit 24 means the arrangement of one or more circuit elements included in the power supply circuit 24. The arrangement of the communication circuit 25 means the arrangement of one or more circuit elements included in the communication circuit 25.

The first main conductor Gm1 is arranged below the power supply connector 20 and the bus connector 21. The power supply connector 20 and the bus connector 21 are connected to the first main conductor Gm1 by through holes, conductive patterns, and the like, which are not shown in the drawings. The first main conductor Gm1 and the second main conductor Gm2 are arranged below the device connector 22, the common mode choke coil 23, and the communication circuit 25. As described above, the device connector 22, the common mode choke coil 23, and the communication circuit 25 are connected to the first main conductor Gm1 and the second main conductor Gm2 by through holes, conductive patterns, and the like. The second main conductor Gm2 is arranged below the power supply circuit 24. As described above, the power supply circuit 24 is connected to the second main conductor Gm2 via through holes, conductive patterns, and the like.

The relay device 11 has a rectangular sub-substrate Bs. FIG. 5 shows the plane of the sub-substrate Bs. As shown in FIG. 5, the sub-substrate Bs is accommodated in the device box body 35. A first sub-conductor Gs1 and a second sub-conductor Gs2 are arranged inside the sub-substrate Bs. The first sub-conductor Gs1 is spaced apart from the second sub-conductor Gs2. The upper and lower surfaces of the sub-substrate Bs, the first sub-conductor Gs1, and the second sub-conductor Gs2 are main surfaces.

The communication line connector 30, the plurality of signal processing circuits 31, the plurality of signal conversion units 32, the relay unit 33, and the apparatus connector 34 are arranged on the upper surface of the sub-substrate Bs.

The communication line connector 30 is arranged near the front wall of the device box body 35. The apparatus connector 34 is arranged near the rear wall of the device box body 35 and is located in front of the device connector 22 of the relay apparatus 10. The common mode choke coil 45 of the signal processing circuit 31 is arranged in the center of the upper surface of the sub-substrate Bs.

The arrangement of the signal processing circuit 31 means the arrangement of one or more circuit elements constituting the signal processing circuit 31. The arrangement of the signal conversion unit 32 means the arrangement of one or more circuit elements constituting the signal conversion unit 32. The arrangement of the relay unit 33 means the arrangement of one or more circuit elements constituting the relay unit 33.

In FIG. 5, description of circuit elements other than the common mode choke coil 23 in the signal processing circuits 31 is omitted. Also, description of the signal conversion units 32 and the relay unit 33 is omitted. FIG. 5 shows an example in which the number of signal processing circuits 31 is three and the number of signal conversion units 32 is three. The following drawings also show an example in which the number of signal processing circuits 31 is three and the number of signal conversion units 32 is three.

As shown in FIG. 5, the rear wall of the device box body 35 is provided with an opening 35b formed therethrough in the front-rear direction. The apparatus connector 34 has a cuboid shape. The apparatus connector 34 is fitted into the opening 35b. The rear surface of the apparatus connector 34 opposes the front surface of the device connector 22 of the relay apparatus 10.

The first sub-conductor Gs1 is arranged below the communication line connector 30. The communication line connector 30 is connected to the first sub-conductor Gs1 through a through hole, a conductive pattern, or the like. The first sub-conductor Gs1 and the second sub-conductor Gs2 are arranged below the apparatus connector 34 and the common mode choke coil 45. The apparatus connector 34 is connected to the first sub-conductor Gs1 and the second sub-conductor Gs2 by through holes, conductive patterns, or the like.

As described above, the signal processing circuit 31 is connected to the first sub-conductor Gs1 and the second sub-conductor Gs2. Accordingly, the signal processing circuit 31 is located above the first sub-conductor Gs1 and the second sub-conductor Gs2. As described above, the signal conversion unit 32 and the relay unit 33 are connected to the second sub-conductor Gs2. Accordingly, the signal conversion units 32 and the relay unit 33 are located above the second sub-conductor Gs2.

Connection Between Relay Apparatus 10 and Relay Device 11

Figure 6:
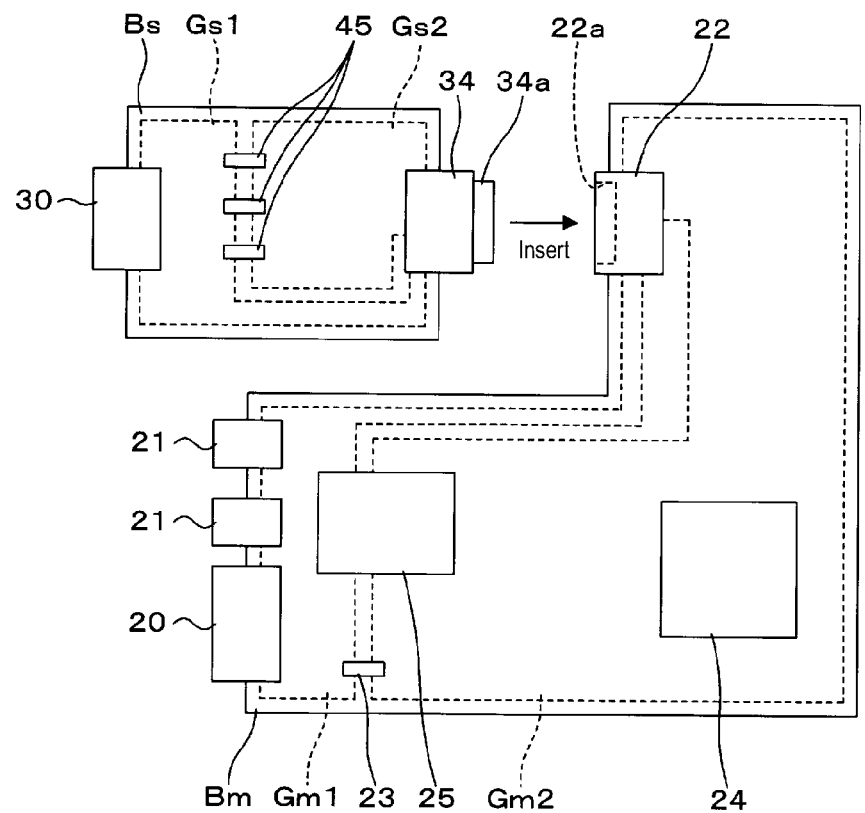
FIG. 6 is an explanatory diagram of connection between a relay apparatus and a relay device.

FIG. 6 is an explanatory diagram of connection between the relay apparatus 10 and the relay device 11. FIG. 6 shows the planes of the main substrate Bm and the sub-substrate Bs. As shown in FIG. 6, the front surface of the device connector 22 of the relay apparatus 10 is provided with a recess 22a recessed rearward. The rear surface of the apparatus connector 34 of the relay device 11 is provided with a protruding portion 34a protruding rearward. The apparatus connector 34 is connected to the device connector 22 by inserting the protruding portion 34a of the apparatus connector 34 into the recess 22a of the device connector 22. When the device connector 22 is connected to the apparatus connector 34, the first main conductor Gm1 and the second main conductor Gm2 are connected to the first sub-conductor Gs1 and the second sub-conductor Gs2, respectively.

Figure 7:
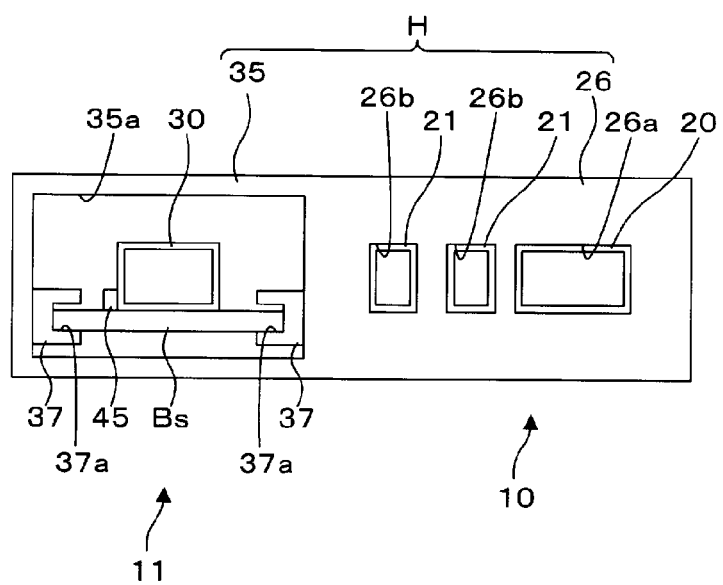
FIG. 7 is a front view of the relay device with a cover removed.

FIG. 7 is a front view of the relay device 11 with the lid 36 removed. The relay device 11 further has two rails 37. As shown in FIGS. 5 and 7, one rail 37 is rod-shaped and protrudes leftward from the right wall inside the device box body 35. The other rail 37 is rod-shaped and protrudes rightward from the left wall inside the device box body 35.

The two rails 37 each extend in the front-rear direction. Therefore, each of the two rails 37 extends toward the bottom surface of the device box body 35 from the open surface of the opening 35a provided in the device box body 35. The leading end surface of the right rail 37 is provided with a recess 37a that is recessed rightward. The recess 37a is formed over the entire length of the right rail 37 in the front-rear direction. Similarly, the leading end surface of the left rail 37 is provided with a recess 37a that is recessed leftward. The recess 37a is formed over the entire length of the left rail 37 in the front-rear direction. The right end of the sub-substrate Bs is arranged in the recess 37a of the right rail 37. The left end of the sub-substrate Bs is arranged in the recess 37a of the left rail 37.

Figure 8:
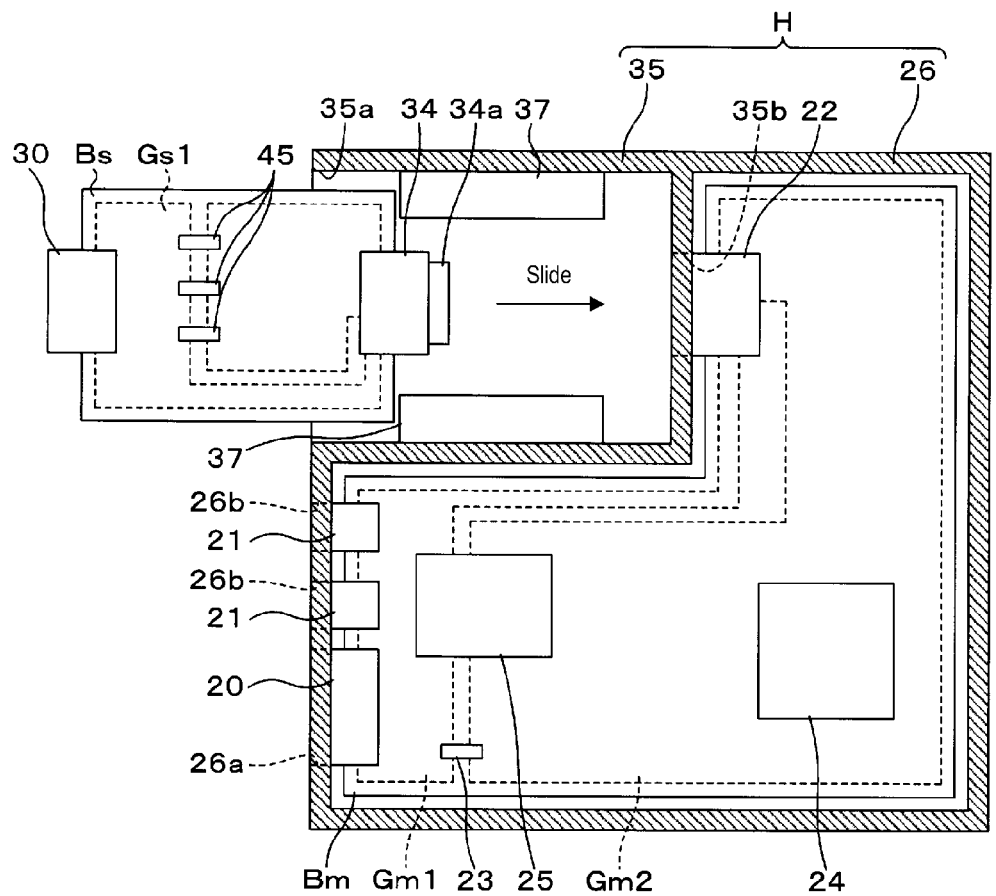
FIG. 8 is an explanatory diagram of a method for inserting a sub-substrate.

FIG. 8 is an explanatory diagram of a method for inserting the sub-substrate Bs. As shown in FIG. 8, the manufacturer of the relay device 11 inserts the sub-substrate Bs into the device box body 35 such that the communication line connector 30 and the apparatus connector 34 are on the front side and the rear side, respectively. At this time, the manufacturer slides the sub-substrate Bs rearward while the right end and the left end of the sub-substrate Bs are located in the recesses 37a of the two rails 37, respectively. The manufacturer inserts the protruding portion 34a of the apparatus connector 34 of the relay device 11 into the recess 22a of the device connector 22 of the relay apparatus 10 and connects the apparatus connector 34 to the device connector 22. Thereafter, the manufacturer closes the opening 35a with the lid 36.

As described above, the device box body 35 accommodates the sub-substrate Bs inserted from the open surface of the opening 35a. The two rails 37 are provided in the device box body 35 of the relay device 11. For this reason, the manufacturer can easily accommodate the sub-substrate Bs in the device box body 35 by moving the sub-substrate Bs along the two rails 37.

Modified Example of First Embodiment

As long as the rails 37 are configured to allow the sub-substrate Bs to slide, there is no problem. For this reason, the configuration of the rails 37 is not limited to the configuration in which the recesses 37a are provided. For example, recesses may also be provided in the sub-substrate Bs instead of the rails 37. In this case, a recess that is recessed leftward is provided over the entire length in the front-rear direction on the right end surface of the sub-substrate Bs. A recess that is recessed rightward is provided over the entire length in the front-rear direction on the left end surface of the sub-substrate Bs. The two rails 37 are respectively arranged inside the two recesses of the sub-substrate Bs. In this case, the rails 37 do not need to be provided with the recesses 37a.

Second Embodiment

In the first embodiment, the apparatus box body 26 of the relay apparatus 10 and the device box body 35 of the relay device 11 need not be formed in one piece.

Hereinafter, differences between the second embodiment and the first embodiment will be described. Configurations other than those described later the same as in the first embodiment. For this reason, components held in common with the first embodiment are denoted by the same reference numerals as in the first embodiment, and description thereof is omitted.

Appearance and Internal Structure of Relay Apparatus 10 and Relay Device 11

Figure 9:
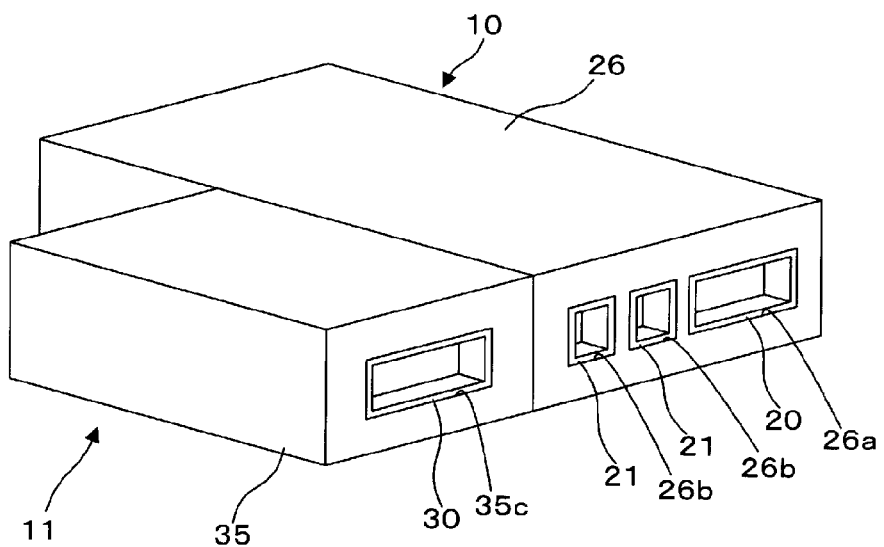
FIG. 9 is a perspective view of a relay apparatus and a relay device according to a second embodiment.

FIG. 9 is a perspective view of the relay apparatus 10 and the relay device 11 according to the second embodiment. The apparatus box body 26 of the relay apparatus 10 has a hollow cuboid shape. The device box body 35 of the relay device 11 has a hollow cuboid shape, as in the first embodiment. The device box body 35 is mounted on the right surface of the apparatus box body 26.

Figure 10:
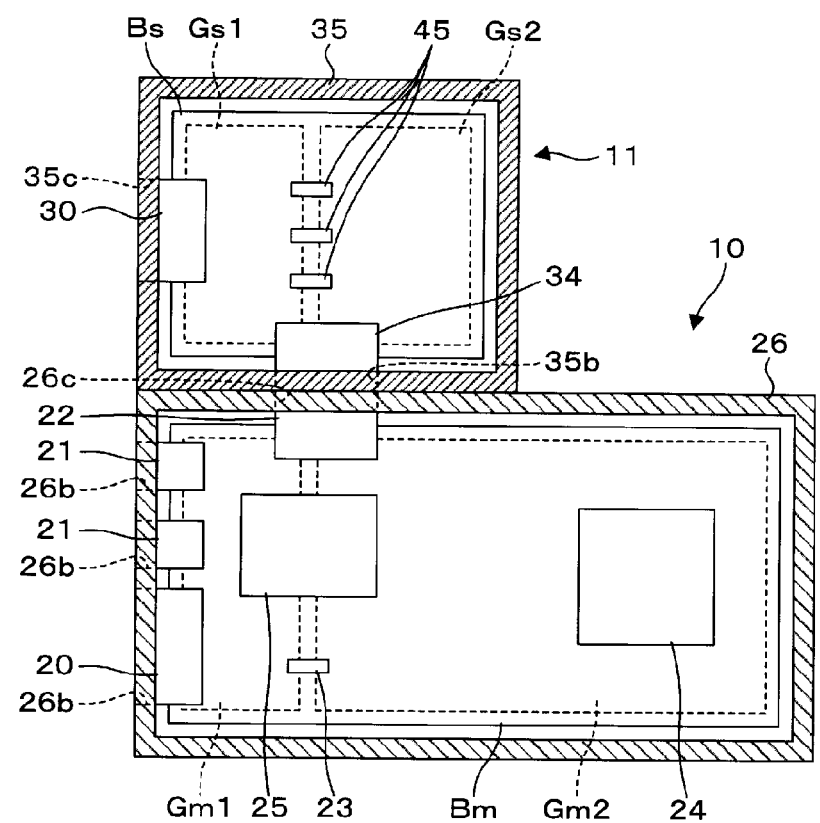
FIG. 10 is a cross-sectional view of the relay apparatus and the relay device.

FIG. 10 is a cross-sectional view of the relay apparatus 10 and the relay device 11. As shown in FIGS. 9 and 10, the device box body 35 is not provided with an opening 35a. For this reason, the relay device 11 does not have the lid 36. The front wall of the device box body 35 is provided with a rectangular opening 35c in the front-rear direction. The opening 35c corresponds to the opening 36a of the first embodiment. The communication line connector 30 is fitted in the opening 35c. The front wall of the apparatus box body 26 is provided with the openings 26a, 26b, as in the first embodiment. The power supply connector 20 is fitted into the opening 26a. The bus connectors 21 are fitted in the openings 26b.

The main substrate Bm of the relay apparatus 10 has a rectangular shape. FIG. 10 shows the plane of the main substrate Bm. The first main conductor Gm1 and the second main conductor Gm2 are arranged inside the main substrate Bm, as in the first embodiment. The first main conductor Gm1 is spaced apart from the second main conductor Gm2. In the second embodiment, the first main conductor Gm1 and the second main conductor Gm2 each have a rectangular plate shape. The first main conductor Gm1 and the second main conductor Gm2 are arranged along the right side. The first main conductor Gm1 is located in front of the second main conductor Gm2.

The device connector 22 is arranged on the edge portion of the right side on the upper surface of the main substrate Bm. The right wall of the apparatus box body 26 is provided with an opening 26c formed therethrough in the left right direction. The device connector 22 is fitted in the opening 26c. The recess 22a is provided on the right surface of the device connector 22 and is recessed leftward.

As in the first embodiment, the first main conductor Gm1 is arranged below the power supply connector 20 and the bus connector 21. The first main conductor Gm1 and the second main conductor Gm2 are arranged below the device connector 22, the common mode choke coil 23, and the communication circuit 25. The second main conductor Gm2 is arranged below the power supply circuit 24.

FIG. 10 shows the plane of the sub-substrate Bs. As in the first embodiment, the first sub-conductor Gs1 and the second sub-conductor Gs2 are arranged inside the sub-substrate Bs. The first sub-conductor Gs1 is spaced apart from the second sub-conductor Gs2. In the second embodiment, the first sub-conductor Gs1 and the second sub-conductor Gs2 have rectangular plate shapes. The first sub-conductor Gs1 and the second sub-conductor Gs2 are arranged along the left side. The first sub-conductor Gs1 is located in front of the second sub-conductor Gs2.

The apparatus connector 34 is arranged on the edge portion on the left side on the upper surface of the sub-substrate Bs. The opening 35b is provided in the left wall of the device box body 35 and is formed therethrough in the left-right direction. As in the first embodiment, the apparatus connector 34 is fitted into the opening 35b.

As in the first embodiment, the first sub-conductor Gs1 is arranged below the communication line connector 30. The first sub-conductor Gs1 and the second sub-conductor Gs2 are arranged below the apparatus connector 34 and the common mode choke coil 45. The signal processing circuits 31 are located above the first sub-conductor Gs1 and the second sub-conductor Gs2. The signal conversion units 32 and the relay unit 33 are located above the second sub-conductor Gs2.

Connection Between Relay Apparatus 10 and Relay Device 11

Figure 11:
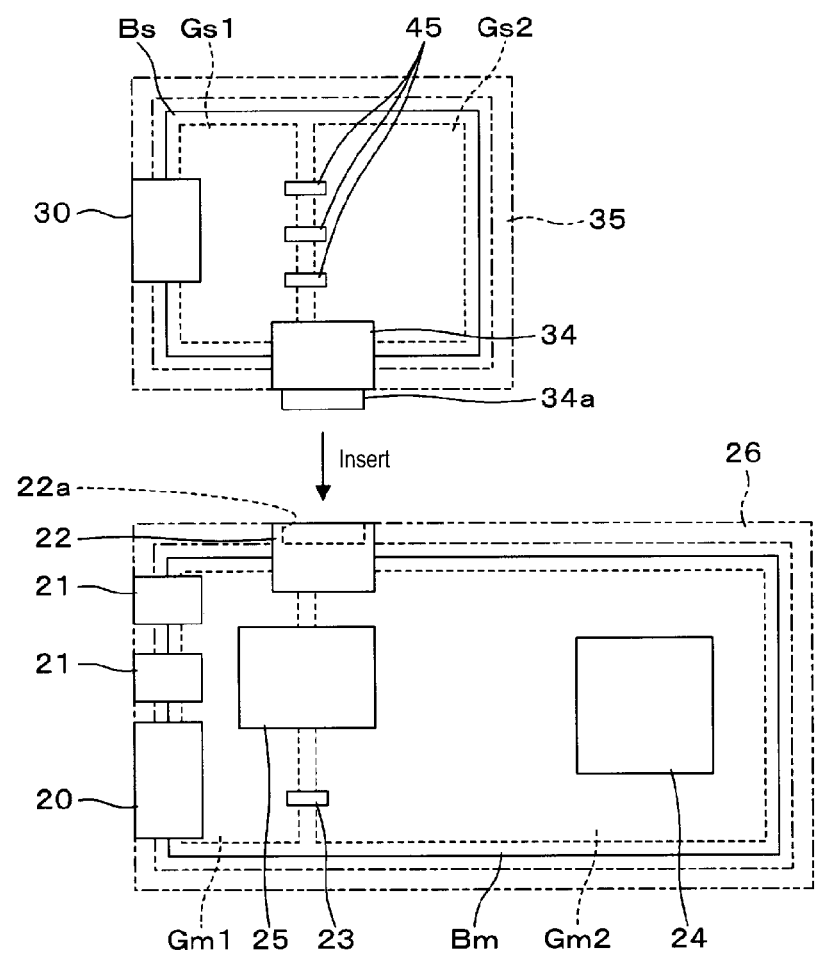
FIG. 11 is an explanatory diagram of connection between the relay apparatus and the relay device.

FIG. 11 is an explanatory diagram of connection between the relay apparatus 10 and the relay device 11. FIG. 11 shows the planes of the main substrate Bm and the sub-substrate Bs. As described above, the device connector 22 of the relay apparatus 10 is arranged on the edge portion on the right side of the main substrate Bm. The recess 22a that is recessed leftward is provided on the right surface of the device connector 22. The apparatus connector 34 of the relay device 11 is arranged at the edge portion on the left side of the sub-substrate Bs. The protruding portion 34a protruding leftward is provided on the left surface of the apparatus connector 34.

The recess 22a of the device connector 22 is exposed to the outside of the apparatus box body 26. Similarly, the protruding portion 34a of the apparatus connector 34 is exposed to the outside of the device box body 35. The manufacturer brings the device box body 35 closer to the apparatus box body 26 from the right side of the apparatus box body 26. The manufacturer inserts the protruding portion 34a of the apparatus connector 34 into the recess 22a of the device connector 22. As a result, the apparatus connector 34 is connected to the device connector 22.

As described above, the relay device 11 is connected from the right side of the apparatus box body 26 of the relay apparatus 10. For this reason, regardless of the size of the sub-substrate Bs of the relay device 11, the relay device 11 can be connected to the relay apparatus 10. The relay device 11 connected to the relay apparatus 10 can be easily changed to a relay device having a large sub-substrate Bs.

The relay device 11 and the communication apparatus according to the second embodiment have the same effects as those of the first embodiment except for the effects obtained by providing the rails 37.

Third Embodiment

In the second embodiment, the configuration of the relay device 11 is not limited to the configuration in which the relay device 11 is connected from the right side of the apparatus box body 26 of the relay apparatus 10.

Hereinafter, differences between the third embodiment and the second embodiment will be described. Configurations other than those described later are the same as those of the second embodiment. For this reason, components held in common with the second embodiment are denoted by the same reference signs as in the second embodiment, and description thereof is omitted.

Appearance and Internal Structure of Relay Apparatus 10 and Relay Device 11

Figure 12:
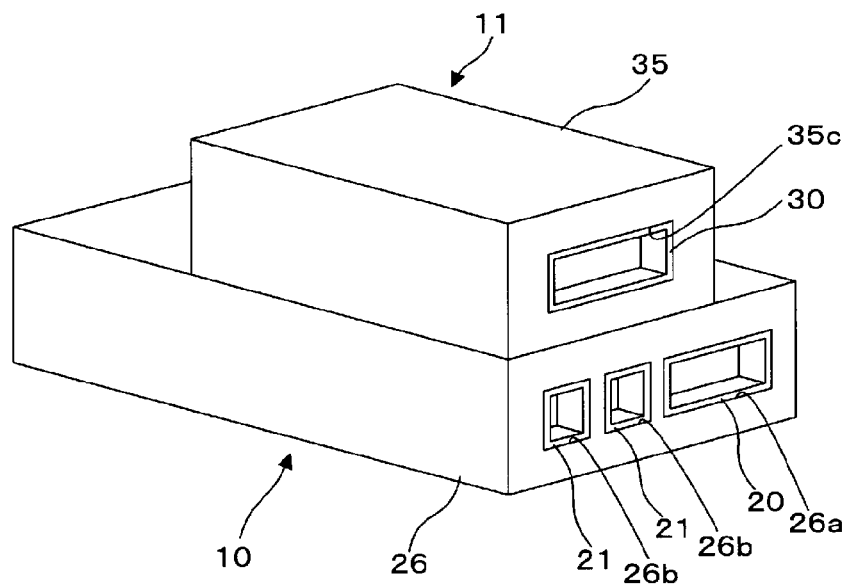
FIG. 12 is a perspective view of a relay apparatus and a relay device according to a third embodiment.

FIG. 12 is a perspective view of the relay apparatus 10 and the relay device 11 according to the third embodiment. As shown in FIG. 12, in the third embodiment, the device box body 35 of the relay device 11 is mounted on the upper surface of the apparatus box body 26.

Figure 13:
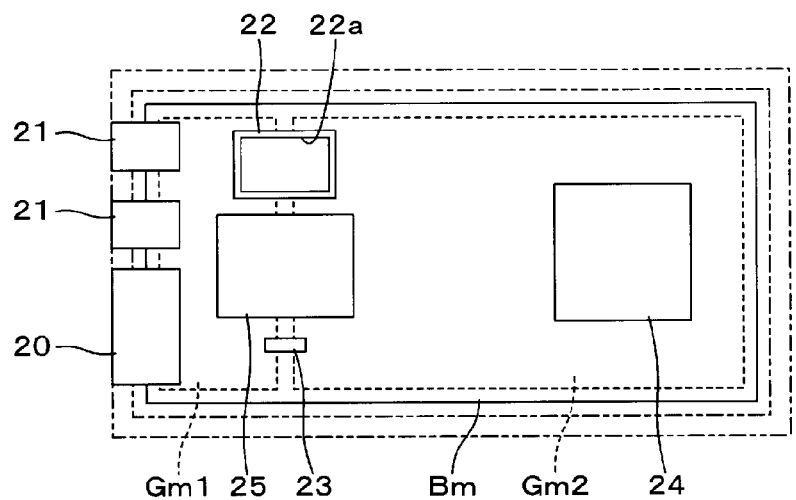
FIG. 13 is a plan view of a main substrate.

FIG. 13 is a plan view of the main substrate Bm. The device connector 22 is arranged on the upper surface of the main substrate Bm of the relay apparatus 10. The device connector 22 protrudes upward from the upper surface of the main substrate Bm. As described in the description of the first embodiment, circuit elements such as the power supply circuit 24 or the communication circuit 25 are arranged on the upper surface of the main substrate Bm. Upward is a direction perpendicular to the upper surface of the main substrate Bm. The recess 22a is provided on the upper surface of the device connector 22 and is recessed downward. The first main conductor Gm1 and the second main conductor Gm2 are arranged below the device connector 22.

Figure 14:
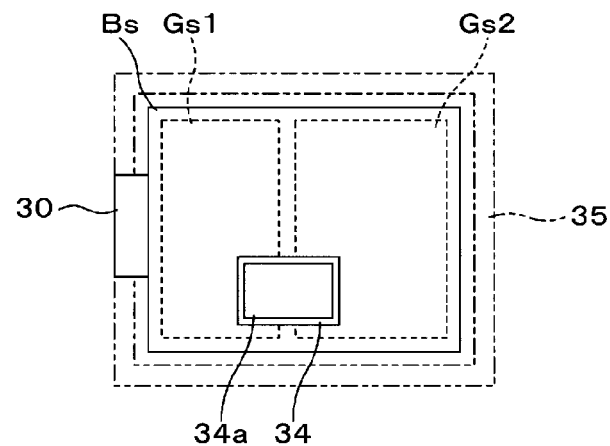
FIG. 14 is a bottom view of a sub-substrate.

FIG. 14 is a bottom view of the sub-substrate Bs. The apparatus connector 34 is arranged on the lower surface of the sub-substrate Bs of the relay device 11. The apparatus connector 34 protrudes downward from the lower surface of the sub-substrate Bs. As stated in the description of the first embodiment, circuit elements such as the signal processing circuits 31, the signal conversion units 32, or the relay unit 33 are arranged on the upper surface of the sub-substrate Bs. The upper surface of the sub-substrate Bs functions as a circuit surface. Downward is a direction perpendicular to the upper surface of the sub-substrate Bs. The protruding portion 34a is provided on the lower surface of the apparatus connector 34 and protrudes downward. The first sub-conductor Gs1 and the second sub-conductor Gs2 are arranged above the apparatus connector 34.

Figure 15:
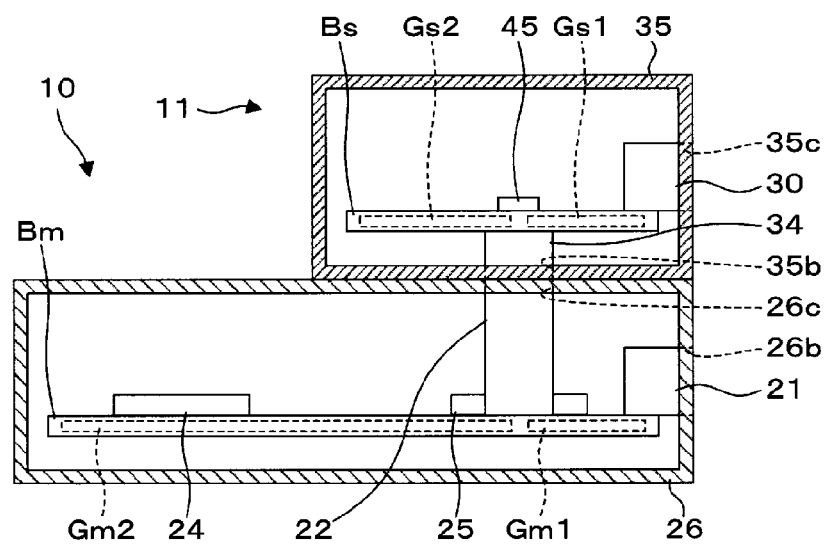
FIG. 15 is a cross-sectional view of the relay apparatus and the relay device.

FIG. 15 is a cross-sectional view of the relay apparatus 10 and the relay device 11. FIG. 15 shows the right surfaces of the main substrate Bm and the sub-substrate Bs. Regarding the relay apparatus 10, the opening 26c is provided in the upper wall of the apparatus box body 26 and is formed therethrough in the up-down direction. The device connector 22 is fitted in the opening 26c. As described above, the upper surface of the device connector 22 is provided with the recess 22a.

Regarding the relay device 11, the opening 35b is provided in the lower wall of the device box body 35 and is formed therethrough in the up-down direction. The apparatus connector 34 is fitted into the opening 35b. As described above, the protruding portion 34a protrudes downward from the lower surface of the apparatus connector 34.

Connection Between Relay Apparatus 10 and Relay Device 11

Figure 16:
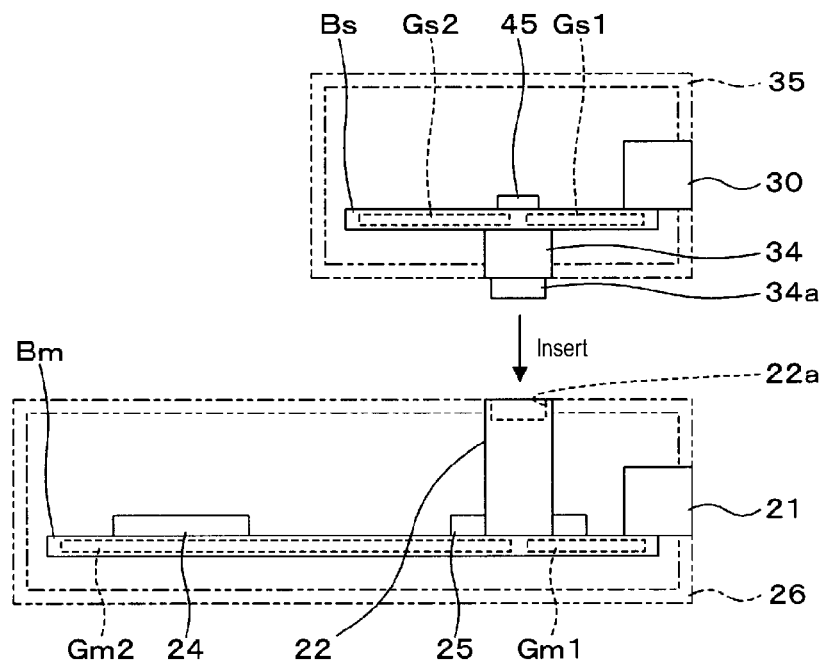
FIG. 16 is an explanatory diagram of connection between the relay apparatus and the relay device.

FIG. 16 is an explanatory diagram of connection between the relay apparatus 10 and the relay device 11. FIG. 16 shows side surfaces of the main substrate Bm and the sub-substrate Bs. As described above, the device connector 22 is fitted into the opening 26c provided in the upper wall of the apparatus box body 26. The recess 22a of the device connector 22 is exposed to the outside of the apparatus box body 26. As described above, the apparatus connector 34 is fitted into the opening 35b provided in the lower wall of the device box body 35. The protruding portion 34a of the apparatus connector 34 is exposed to the outside of the device box body 35.

The manufacturer brings the device box body 35 close to the apparatus box body 26 from above the apparatus box body 26. The manufacturer inserts the protruding portion 34a of the apparatus connector 34 into the recess 22a of the device connector 22. As a result, the apparatus connector 34 is connected to the device connector 22. The device connector 22 of the relay apparatus 10 is connected at the lower end (leading end) of the apparatus connector 34.

As described above, the relay device 11 is connected from above the apparatus box body 26 of the relay apparatus 10. For this reason, regardless of the size of the sub-substrate Bs of the relay device 11, the relay device 11 can be connected to the relay apparatus 10. The relay device 11 connected to the relay apparatus 10 can be easily changed to a relay device having a large sub-substrate Bs.

The relay device 11 and the communication apparatus according to the third embodiment have the same effects as those of the second embodiment.

Modified Example of Second and Third Embodiments

The configuration of the relay device 11 in each of the second and third embodiments may also be a configuration in which the sub-substrate Bs slides along the rails 37 as in the first embodiment. For example, the communication line connector 30 is arranged on the edge portion on the right side of the sub-substrate Bs. In this case, the rails 37 extending in the left-right direction are provided on the front wall and the rear wall of the device box body 35. An opening is provided in the right wall of the device box body 35. The sub-substrate Bs is inserted into the device box body 35 from the open surface of this opening. The opening is closed by the lid, as in the first embodiment. The lid is provided with an opening. The communication line connector 30 is fitted into the opening of the lid. A recess is provided on the right side of the communication line connector 30.

In the second and third embodiments, attachment members for attaching the relay apparatus 10 and the relay device 11 may also be provided on the left or right surfaces of the apparatus box body 26 and the device box body 35. In this case, for example, some of the attachment members are provided on the left surface or right surface of the apparatus box body 26. The rest of the attachment members are provided on the left surface or right surface of the device box body 35.

Fourth Embodiment

In the first embodiment, the first main conductor Gm1 of the relay apparatus 10 is connected to the first sub-conductor Gs1 of the relay device 11 via the device connector 22 and the apparatus connector 34. The connection between the first main conductor Gm1 and the first sub-conductor Gs1 is not limited to connection via the device connector 22 and the apparatus connector 34.

Hereinafter, differences between the fourth embodiment and the first embodiment will be described. Configurations other than those described later are the same as those in the first embodiment. For this reason, components that are held in common with the first embodiment are denoted by the same reference numerals as in the first embodiment, and description thereof is omitted.

Internal Structure of Relay Apparatus 10 and Relay Device 11

Figure 17:
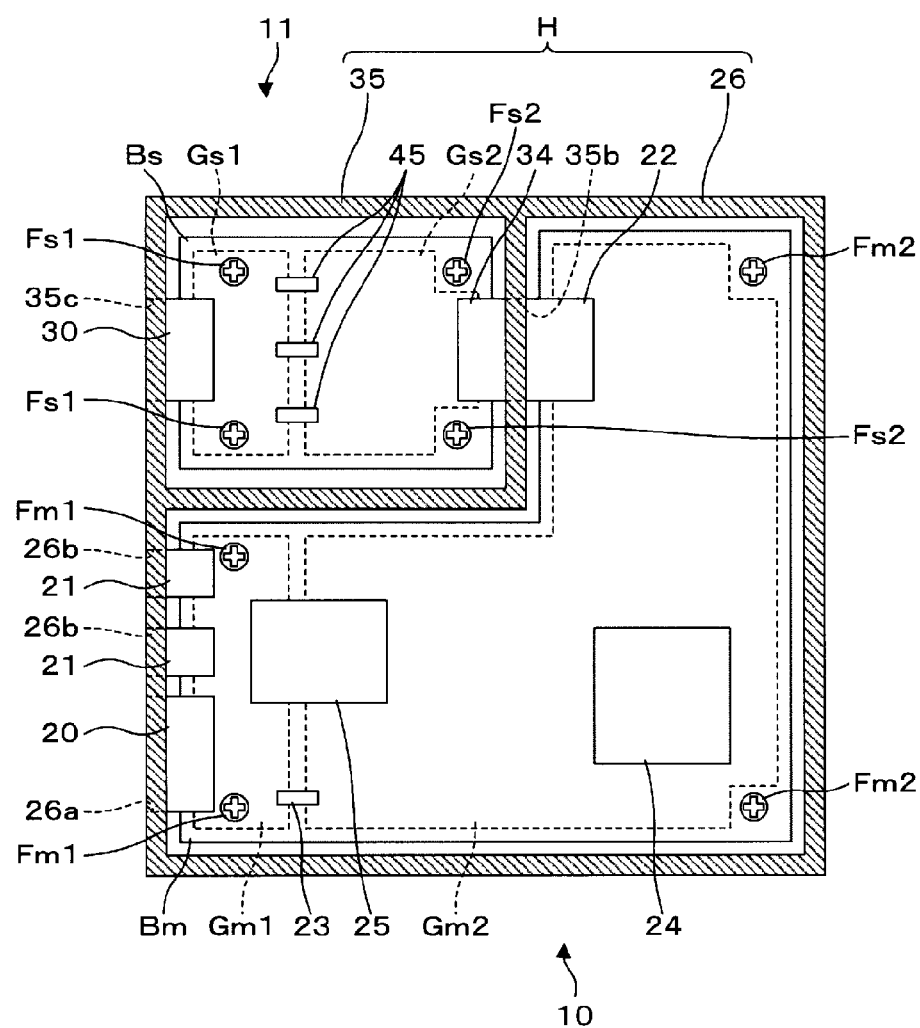
FIG. 17 is a cross-sectional view of a relay apparatus and a relay device according to a fourth embodiment.

FIG. 17 is a cross-sectional view of the relay apparatus 10 and the relay device 11 according to the fourth embodiment. In the relay apparatus 10, as in the first embodiment, the main substrate Bm is accommodated in the apparatus box body 26. The main substrate Bm is fixed to the lower wall of the apparatus box body 26 with four apparatus screws Fm1, Fm2. The second main conductor Gm2 is arranged below the device connector 22. In the fourth embodiment, the first main conductor Gm1 is not arranged below the device connector 22. The first main conductor Gm1 is arranged near the front wall.

In the relay device 11, as in the first embodiment, the sub-substrate Bs is accommodated in the device box body 35. The sub-substrate Bs is fixed to the bottom wall of the device box body 35 by four device screws Fs1, Fs2.

The device box body 35 is not provided with the opening 35a. For this reason, the relay device 11 does not have the lid 36. The front wall of the device box body 35 is provided with a rectangular opening 35c in the front-rear direction, as in the second embodiment. The opening 35c corresponds to the opening 36a of the first embodiment. The communication line connector 30 is fitted in the opening 35c. The second sub-conductor Gs2 is arranged below the apparatus connector 34. In the fourth embodiment, the first sub-conductor Gs1 is not arranged below the apparatus connector 34. The first sub-conductor Gs1 is arranged near the front wall.

Electrical Connection Between First Main Conductor Gm1 and First Sub-Conductor Gs1

Figure 18:
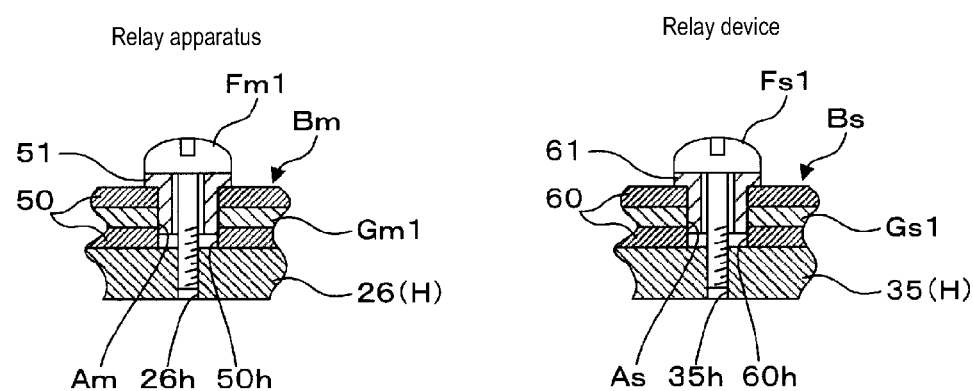
FIG. 18 is an explanatory diagram of electrical connection between a first main conductor and a first sub-conductor.

FIG. 18 is an explanatory diagram of electrical connection between the first main conductor Gm1 and the first sub-conductor Gs1. FIG. 18 shows a cross section around the apparatus screw Fm1 of the relay apparatus 10 and a cross section around the device screw Fs1 of the relay device 11.

The main substrate Bm of the relay apparatus 10 has an insulating plate 50. The insulating plate 50 has insulating properties. The first main conductor Gm1 is arranged in the insulating plate 50. The insulating plate 50 and the first main conductor Gm1 are respectively provided with through holes 50h, Am formed therethrough in the up-down direction. The through hole 50h is in communication with the through hole Am. Also, the lower wall of the apparatus box body 26 is provided with a screw hole 26h formed therethrough in the up-down direction. Each of the through holes 50h, Am is in communication with the screw hole 26h. The surfaces of the through holes 50h, Am are covered with a conductive apparatus plating 51. The apparatus plating 51 further covers the edge portion of the through hole 50h on the upper surface of the insulating plate 50. The apparatus plating 51 is electrically connected to the first main conductor Gm1.

The threaded portion of the apparatus screw Fm1 is passed through the through holes 50h, Am. The apparatus screw Fm1 passes through the inside of the apparatus plating 51. The apparatus screw Fm1 is inserted into the screw hole 26h while passing through the through holes 50h, Am. In this state, the apparatus screw Fm1 is tightened in the screw hole 26h. When the apparatus screw Fm1 is tightened, the apparatus screw Fm1 comes into contact with the apparatus plating 51 and the apparatus box body 26. In the fourth embodiment, the apparatus box body 26 and the device box body 35, which are formed in one piece, are each electrically conductive. The apparatus screw Fm1 is also electrically conductive. Due to the apparatus screw Fm1 coming into contact with the apparatus plating 51 and the apparatus box body 26, the first main conductor Gm1 is electrically connected to the apparatus box body 26 via the apparatus plating 51 and the apparatus screw Fm1.

Similarly, the sub-substrate Bs of the relay device 11 has an insulating plate 60. The insulating plate 60 has insulating properties. The first sub-conductor Gs1 is arranged in the insulating plate 60. The insulating plate 60 and the first sub-conductor Gs1 are respectively provided with through holes 60h, As formed therethrough in the up-down direction. The through hole 60h is in communication with the through hole As. Also, the lower wall of the device box body 35 is provided with a screw hole 35h formed therethrough in the up-down direction. Each of the through holes 60h, As is in communication with the screw hole 35h. The surfaces of the through-holes 60h, As are covered with electrically-conductive device plating 61. The device plating 61 also covers the edge portions of the through holes 60h on the upper surface of the insulating plate 60. The device plating 61 is electrically connected to the first sub-conductor Gs1.

The threaded portion of the device screw Fs1 is passed through the through holes 60h, As. The device screw Fs1 passes through the inside of the device plating 61. The device screw Fs1 is inserted into the screw hole 35h while the device screw Fs1 is passed through the through holes 60h, As. In this state, the device screw Fs1 is tightened in the screw hole 35h. When the device screw Fs1 is tightened, the device screw Fs1 comes into contact with the device plating 61 and the device box body 35. The device screw Fs1 is electrically conductive. Accordingly, the first sub-conductor Gs1 is electrically connected to the device box body 35 via the device plating 61 and the device screw Fs1. The device screw Fs1 and the through hole 60h function as a second screw and a second through hole, respectively.

As described above, the apparatus box body 26 and the device box body 35 are formed in one piece. Accordingly, the apparatus box body 26 is electrically connected to the device box body 35. Accordingly, in the fourth embodiment, the first main conductor Gm1 is electrically connected to the first sub-conductor Gs1 via the apparatus plating 51, the apparatus screws Fm1, the accommodation box H, the device screws Fs1, and the device plating 61. In the fourth embodiment, the first main conductor Gm1 is connected to the first sub-conductor Gs1 without the device connector 22 and the apparatus connector 34 interposed therebetween.

When the main substrate Bm is fixed to the apparatus box body 26 by tightening the apparatus screws Fm2, the apparatus screws Fm2 do not come into contact with the second main conductor Gm2 and are not electrically connected to the second main conductor Gm2. Similarly, when the sub-substrate Bs is fixed to the device box body 35 by tightening the device screws Fs2, the device screws Fs2 do not come into contact with the second sub-conductor Gs2 and are not electrically connected to the second sub-conductor Gs2.

Note that if the apparatus screws Fm2 have insulating properties, the apparatus screws Fm2 may also come into contact with the second main conductor Gm2. If the device screws Fs2 have insulating properties, the device screws Fs2 may also come into contact with the second sub-conductor Gs2.

The relay device 11 and the communication apparatus according to the fourth embodiment have the same effects as those of the first embodiment except for the effects obtained by providing the rails 37.

Modified Example of Second to Fourth Embodiments

In the fourth embodiment, the configuration of the relay device 11 may also be a configuration in which the sub-substrate Bs slides along the rails 37, as in the first embodiment. Also, in each of the second and third embodiments, as in the fourth embodiment, the apparatus screw Fm1 may also be used to realize electrical connection of the first main conductor Gm1. Furthermore, the electrical connection of the first sub-conductor Gs1 may also be realized using the device screws Fs1. In this case, the apparatus box body 26 and the device box body 35 are electrically conductive. For example, by bringing the apparatus box body 26 into contact with the device box body 35, electrical connection between the apparatus box body 26 and the device box body 35 is realized.

Fifth Embodiment

In the first embodiment, the apparatus to which the relay device 11 is connected is not limited to the relay apparatus 10. Hereinafter, differences between the fifth embodiment and the first embodiment will be described. Configurations other than those described later are the same as those in the first embodiment. For this reason, components that are held in common with the first embodiment are denoted by the same reference numerals as in the first embodiment, and description thereof is omitted.

Configuration of Communication System 1

Figure 19:
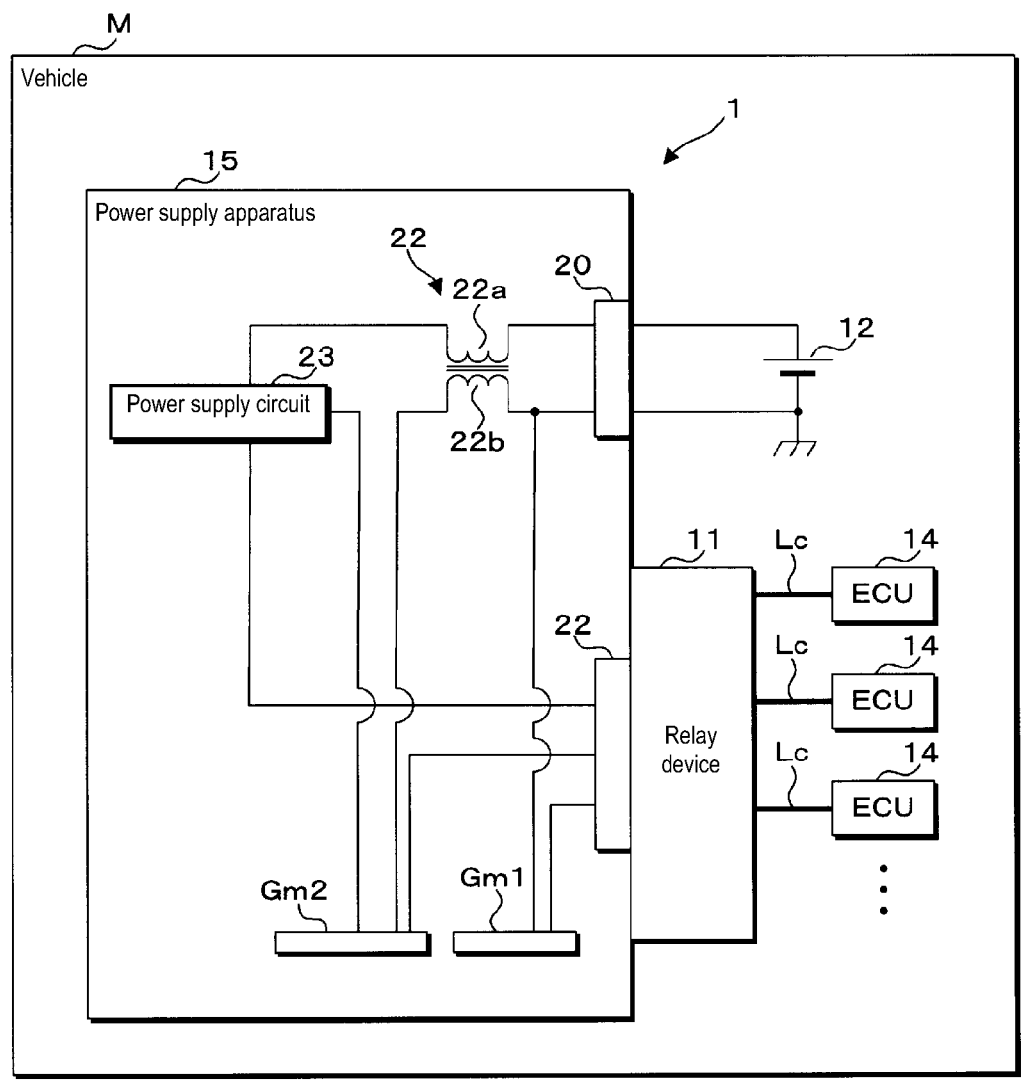
FIG. 19 is a block diagram showing a configuration of a main part of a communication system according to a fifth embodiment.

FIG. 19 is a block diagram showing a configuration of a main part of the communication system 1 according to the fifth embodiment. When the first and fifth embodiments are compared, the apparatuses connected to the relay device 11 are different. The communication system 1 according to the fifth embodiment includes a power supply apparatus 15 instead of the relay apparatus 10. The DC power supply 12 supplies power to the power supply apparatus 15. The power supply apparatus 15 supplies power to the relay device 11. In the fifth embodiment, multiple ECUs 14 are connected to the relay device 11. The relay device 11 relays communication between two ECUs 14, as in the first embodiment.

Configuration of Power Supply Apparatus 15

The configuration of the power supply apparatus 15 is the same as that of the relay apparatus 10 according to the first embodiment, except that the one or more bus connectors 21 and the communication circuit 25 are removed. The relay device 11 is attached to the device connector 22 of the power supply apparatus 15. As a result, the relay device 11 is connected to the device connector 22 of the power supply apparatus 15. The relay device 11 and the communication apparatus according to the fifth embodiment have the same effects as those of the first embodiment. FIG. 19 shows an example in which a second inductor 23b connects the first main conductor Gm1 and the second main conductor Gm2. As stated in the description of the first embodiment, a resistor may also connect the first main conductor Gm1 and the second main conductor Gm2.

Modified Example of Fifth Embodiment

In the fifth embodiment, the relay device 11 may also be configured similarly to any one of the second to fourth embodiments.

Sixth Embodiment

In the first embodiment, the main substrate Bm and the sub-substrate Bs are accommodated in the apparatus box body 26 and the device box body 35, respectively. However, the device box body 35 may also be installed on the main substrate Bm.

Hereinafter, differences between the sixth embodiment and the first embodiment will be described. Configurations other than those described later are the same as those in the first embodiment. For this reason, components that are held in common with the first embodiment are denoted by the same reference numerals as in the first embodiment, and description thereof is omitted.

Configuration of Relay Apparatus 10

Figure 20:
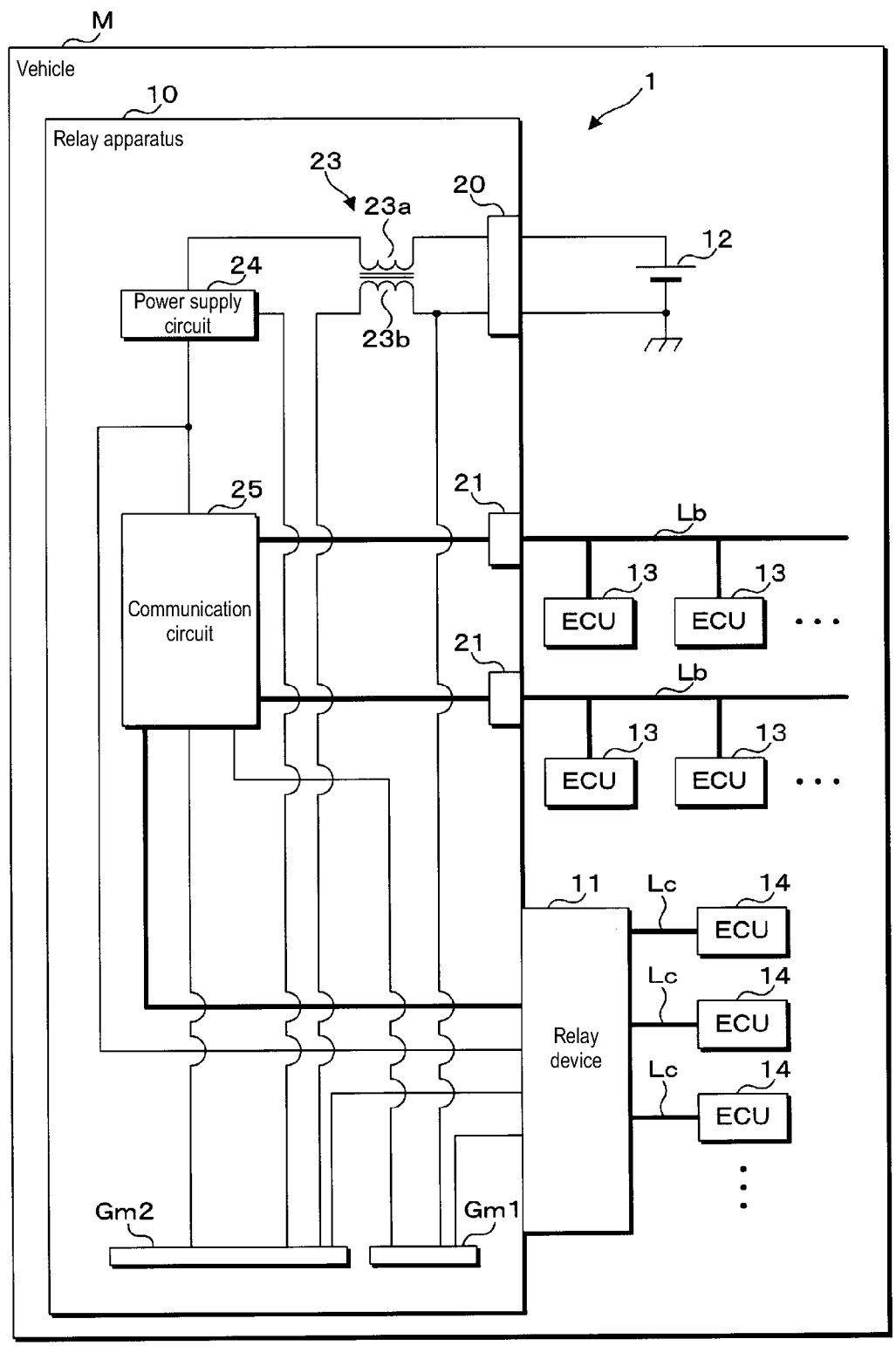
FIG. 20 is a block diagram showing a configuration of a main part of a relay apparatus according to a sixth embodiment.

FIG. 20 is a block diagram showing a configuration of a main part of the relay apparatus 10 according to the sixth embodiment. The relay apparatus 10 according to the sixth embodiment has components other than the device connector 22 among the components of the relay apparatus 10 according to the first embodiment. In the relay apparatus 10 according to the sixth embodiment, the power supply circuit 24, the communication circuit 25, the first main conductor Gm1, and the second main conductor Gm2 are each connected to the relay device 11 without the device connector 22 interposed therebetween. Each component of the relay apparatus 10 operates in the same manner as in the first embodiment. The relay device 11 is attached to the relay apparatus 10. As a result, the power supply circuit 24, the communication circuit 25, the first main conductor Gm1, and the second main conductor Gm2 of the relay apparatus 10 are connected to the relay device 11.

Configuration of Relay Device 11

Figure 21:
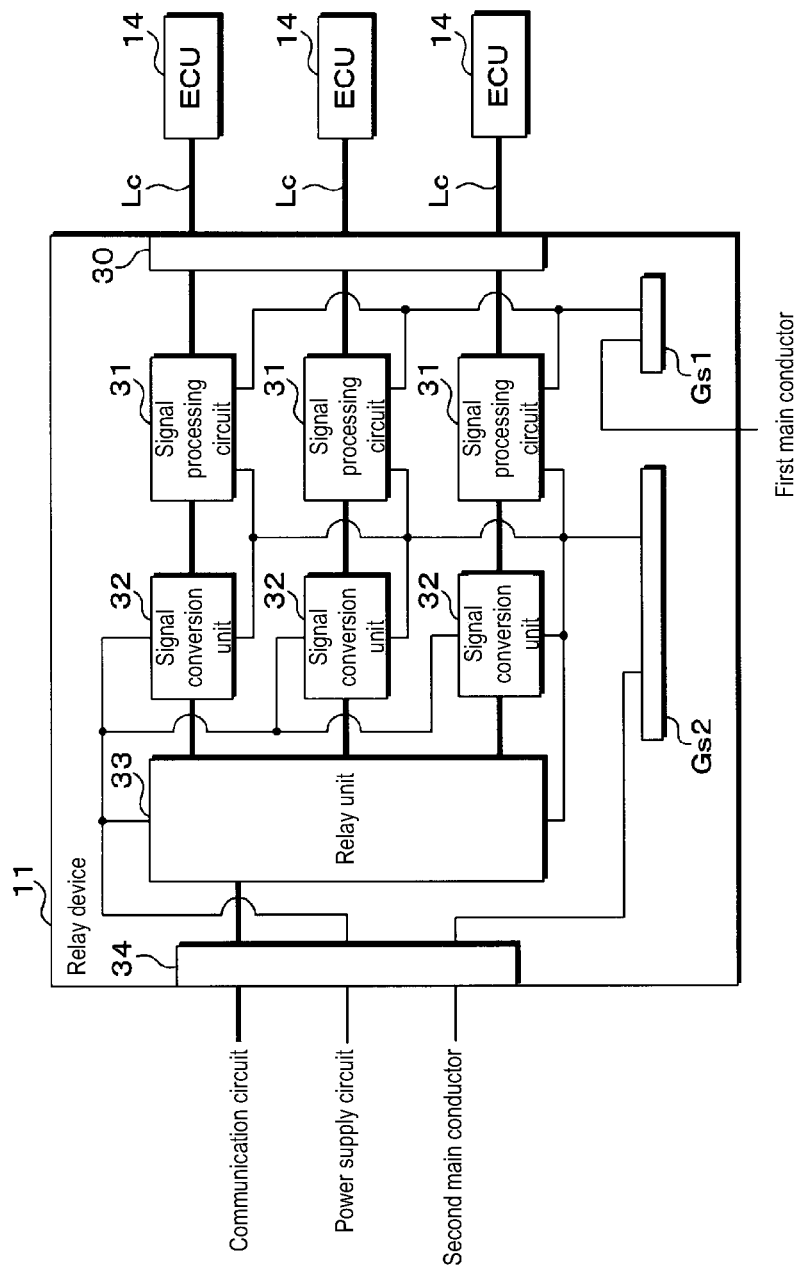
FIG. 21 is a block diagram showing a configuration of a main part of a relay device.

FIG. 21 is a block diagram showing a configuration of a main part of the relay device 11. As in the first embodiment, the power supply circuit 24 is connected to a plurality of signal conversion units 32 and the relay unit 33 via the apparatus connector 34. The communication circuit 25 is connected to the relay unit 33 via the apparatus connector 34. The second main conductor Gm2 is connected to the second sub-conductor Gs2. In the sixth embodiment, the first main conductor Gm1 is connected to the first sub-conductor Gs1 without the apparatus connector 34 interposed therebetween.

Arrangement of Relay Device 11

Figure 22:
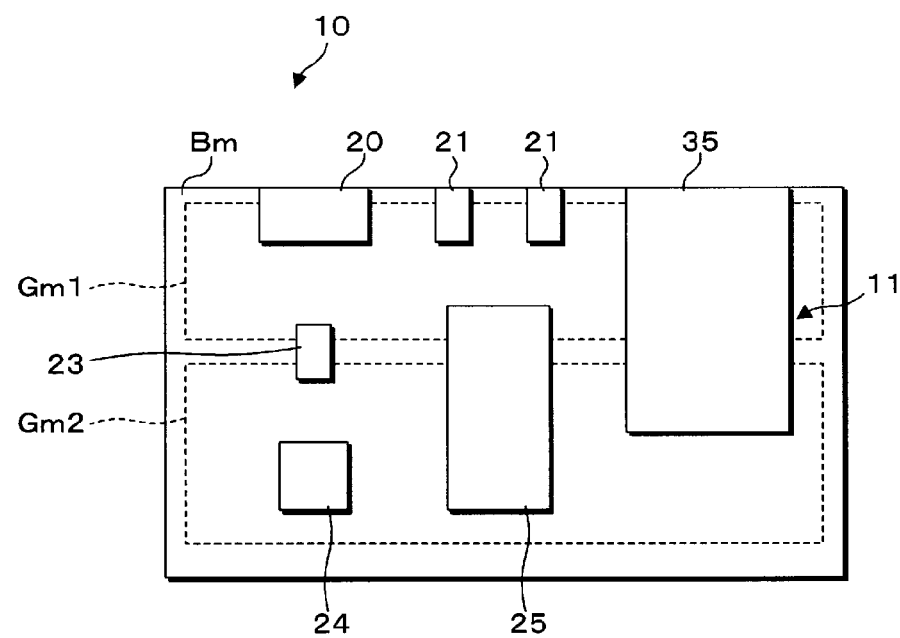
FIG. 22 is a plan view of the relay apparatus and the relay device.

FIG. 22 is a plan view of the relay apparatus 10 and the relay device 11. FIG. 22 shows an example in which the number of bus connectors 21 is two. As shown in FIG. 22, the relay apparatus 10 further has the main substrate Bm. The first main conductor Gm1 and the second main conductor Gm2 are arranged inside the main substrate Bm. Each of the first main conductor Gm1 and the second main conductor Gm2 has a rectangular plate shape. The first main conductor Gm1 and the second main conductor Gm2 are arranged in the front-rear direction of the relay apparatus 10. FIG. 22 shows the upper surfaces of the main substrate Bm, the first main conductor Gm1, and the second main conductor Gm2. The upper surfaces and the lower surfaces of the main substrate Bm, the first main conductor Gm1, and the second main conductor Gm2 are main surfaces.

The relay device 11, the power supply connector 20, the two bus connectors 21, the common mode choke coil 23, the power supply circuit 24, and the communication circuit 25 are arranged on the upper surface of the main substrate Bm. As stated in the description of the first embodiment, the power supply connector 20 is connected to the first main conductor Gm1. The power supply circuit 24 is connected to the second main conductor Gm2. The relay device 11, the common mode choke coil 23, and the communication circuit 25 are each connected to both the first main conductor Gm1 and the second main conductor Gm2. Connection to the first main conductor Gm1 or the second main conductor Gm2 is realized by through holes, conductive patterns, and the like.

Appearance of Relay Device 11

Figure 23:
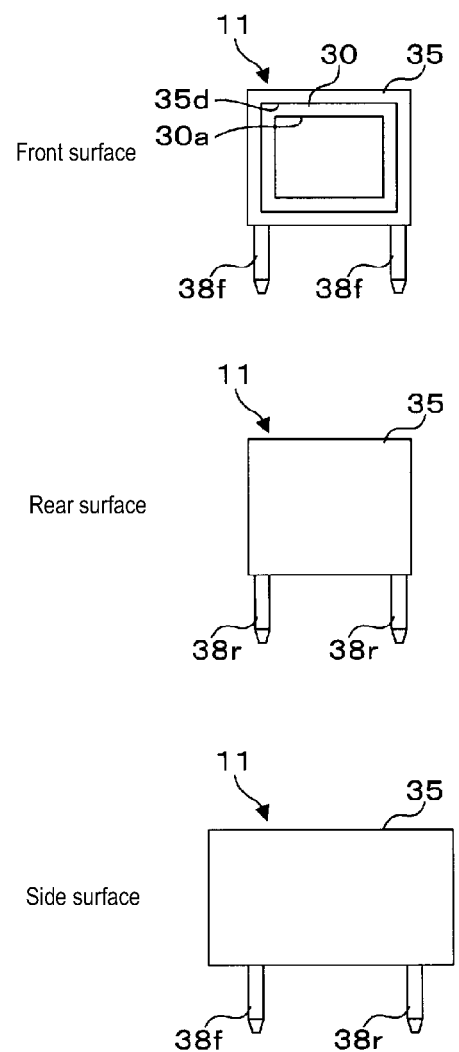
FIG. 23 is an explanatory diagram of the external appearance of the relay device.

FIG. 23 is an explanatory diagram of the appearance of the relay device 11. FIG. 23 shows the front, rear, and side surfaces of the relay device 11. The device box body 35 of the relay device 11 has a hollow cuboid shape, as in the first embodiment. The front wall of the device box body 35 is provided with an opening 35d.

Two first protruding portions 38f and two second protruding portions 38r protrude downward (outside the device box body 35) from the lower surface of the device box body 35. The two first protruding portions 38f are arranged side by side in the left-right direction. The two second protruding portions 38r are also arranged side by side in the left-right direction. The first protruding portions 38f and the second protruding portions 38r are arranged on the front side and the rear side, respectively. The upper side of FIG. 22 corresponds to the front sides of the relay apparatus 10 and the relay device 11. The communication line connector 30 is inserted into the device box body 35 through the opening 35d.

Figure 24:
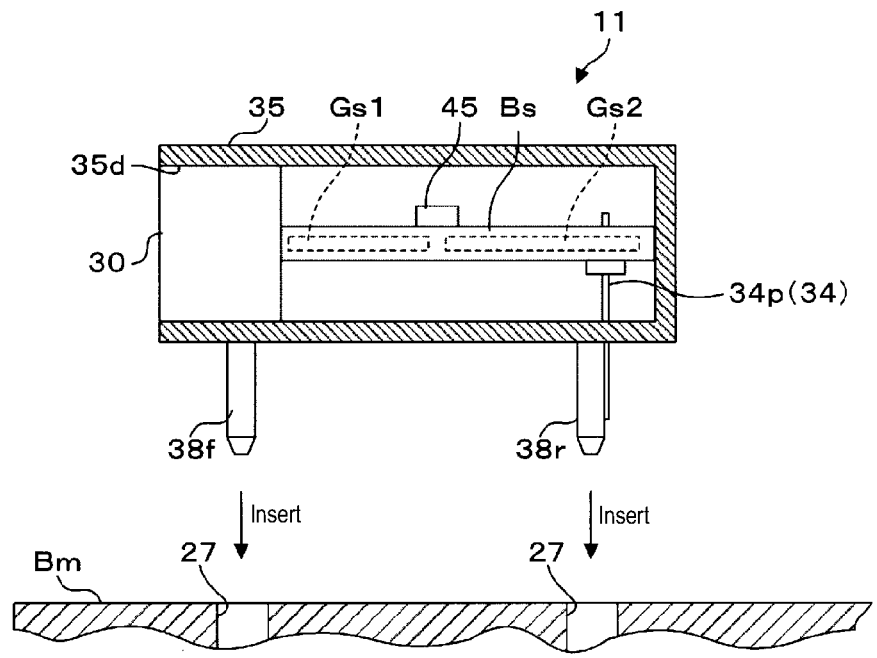
FIG. 24 is a cross-sectional view of the relay device.

FIG. 24 is a cross-sectional view of the relay device 11. As in the first embodiment, the device box body 35 accommodates the sub-substrate Bs. The first sub-conductor Gs1 and the second sub-conductor Gs2 are arranged inside the sub-substrate Bs. As shown in FIGS. 23 and 24, the communication line connector 30 has a hollow cuboid shape with one open surface. As shown in FIG. 23, the front surface of the communication line connector 30 is provided with the opening 30a. For example, the end of a cable including a plurality of communication lines Lc is inserted into the opening 30a of the communication line connector 30. As a result, a plurality of communication lines Lc are connected to the communication line connector 30. As shown in FIG. 24, the rear surface of the communication line connector 30 closes the opening 35d of the device box body 35. The main substrate Bm is provided with a plurality of through holes 27 formed therethrough in the up-down direction. The first protruding portions 38f and the second protruding portions 38r of the relay device 11 are respectively inserted into the through holes 27 of the main substrate Bm.

Thereafter, the first protruding portions 38f and the second protruding portions 38r are respectively connected to the main substrate Bm by soldering. As a result, the device box body 35 is fixed to the main substrate Bm. The device box body 35 and the first protruding portions 38f are electrically conductive. The first protruding portions 38f are electrically connected to the first main conductor Gm1 arranged inside the main substrate Bm, for example, by soldering.

As shown in FIG. 24, the front end surface of the sub-substrate Bs is connected to the rear surface of the communication line connector 30. The communication line connector 30, the plurality of signal processing circuits 31, the plurality of signal conversion units 32, the relay unit 33, and the apparatus connector 34 are arranged on the main surface of the sub-substrate Bs. The device box body 35 is electrically connected to the first sub-conductor Gs1 via a conductor (not shown). As described above, the first protruding portions 38f protrude from the device box body 35. Accordingly, the first protruding portions 38f are electrically connected to the device box body 35. As a result, the first protruding portions 38f are electrically connected to the first sub-conductor Gs1 via the device box body 35.

As described above, when the device box body 35 of the relay device 11 is fixed to the main substrate Bm by soldering, the first protruding portions 38f are electrically connected to the first main conductor Gm1. Accordingly, the first sub-conductor Gs1 is electrically connected to the first main conductor Gm1 via the device box body 35 and the first protruding portions 38f. The first main conductor Gm1 and the first sub-conductor Gs1 are treated as one conductor.

Note that the device box body 35 is spaced apart from the second sub-conductor Gs2. The device box body 35 is not directly electrically connected to the second main conductor Gm2 via the conductor.

Figure 25:
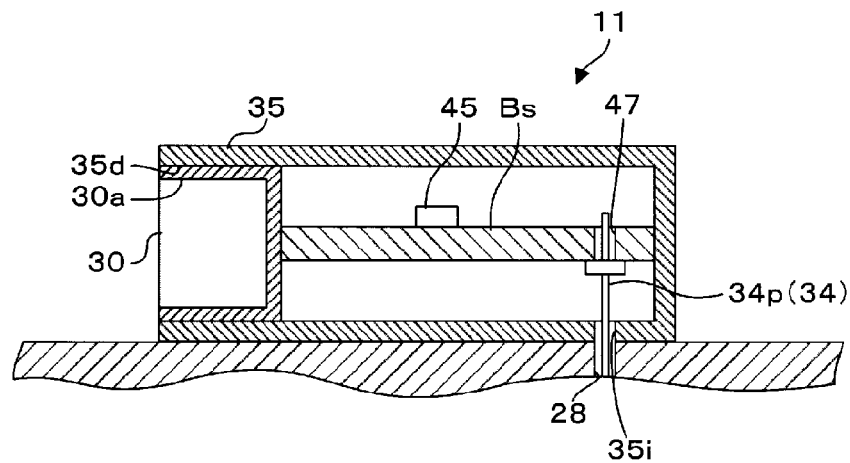
FIG. 25 is another cross-sectional view of the relay device.

FIG. 25 is another cross-sectional view of the relay device 11. The apparatus connector 34 of the relay device 11 has conductive rods 34p that are electrically conductive. The conductive rods 34p are so-called lead pins. As shown in FIG. 25, insertion holes 47 into which the conductive rods 34p are inserted are provided rearward of the sub-substrate Bs. The insertion holes 47 are formed in the up-down direction. The number of conductive rods 34p is two or more and the number of insertion holes 47 is two or more.

The lower wall of the device box body 35 is provided with a through hole 35i formed therethrough in the up-down direction. The upper surface of the main substrate Bm of the relay apparatus 10 is provided with insertion holes 28 into which the conductive rods 34p are inserted. The conductive rods 34p pass through the through holes 35i. In this state, the conductive rods 34p are inserted into the two insertion holes 28, 47. Inside the insertion holes 28, the conductive rods 34p are connected to the main substrate Bm by soldering. Inside the insertion holes 47, the conductive rods 34p are connected to the sub-substrate Bs by soldering. Accordingly, the conductive rods 34p of the apparatus connector 34 connect the sub-substrate Bs and the main substrate Bm of the relay apparatus 10 to each other. The conductive rods 34p are electrically connected to conductive patterns provided on the main substrate Bm and the sub-substrate Bs by soldering.

Inside the through holes 35i, the spaces between the conductive rods 34p and the device box body 35 are filled with an insulator. The device box body 35 is spaced apart from the conductive rods 34p and is not electrically connected to the conductive rods 34p.

The apparatus connector 34 has at least three conductive rods 34p. As shown in FIG. 21, the first conductive rod 34p connects the communication circuit 25 of the relay apparatus 10 and the relay unit 33 of the relay device 11 to each other. The second conductive rod 34p connects the power supply circuit 24 of the relay apparatus 10 and the signal conversion unit 32 and the relay unit 33 of the relay device 11 to each other. Accordingly, power is supplied from the power supply circuit 24 to the signal conversion unit 32 and the relay unit 33 via the conductive rod 34p of the apparatus connector 34. The third conductive rod 34p connects the second main conductor Gm2 of the relay apparatus 10 and the second sub-conductor Gs2 of the relay device 11 to each other. Accordingly, the second main conductor Gm2 is electrically connected to the second sub-conductor Gs2. For this reason, the second main conductor Gm2 and the second sub-conductor Gs2 are treated as one conductor. The relay device 11 and the communication apparatus according to the sixth embodiment have the same effects as those of the first embodiment except for the effects obtained by providing the rails 37.

Modified Example of Sixth Embodiment

The configuration of the relay device 11 of the sixth embodiment may also be a configuration in which the sub-substrate Bs slides along the rails 37, as in the first embodiment. Also, as in the fourth embodiment, the device screw Fs1 may be used to realize electrical connection between the device box body 35 and the first main conductor Gm1.

Seventh Embodiment

In the sixth embodiment, the configuration of the apparatus connector 34 of the relay device 11 is not limited to the configuration having the conductive rods 34p. Also, the communication line connector 30 is not limited to a hollow cuboid shape with one open surface. Furthermore, the method for realizing electrical connection between the first main conductor Gm1 of the relay apparatus 10 and the first sub-conductor Gs1 of the relay device 11 is not limited to the method of achieving electrical connection using the device box body 35 and the first protruding portions 38f.

Hereinafter, differences between the seventh embodiment and the sixth embodiment will be described. Configurations other than those described later are the same as in the sixth embodiment. For this reason, components held in common with the sixth embodiment are denoted by the same reference numerals as those of the sixth embodiment, and description thereof is omitted.

Internal Structure of Relay Device 11

Figure 26:
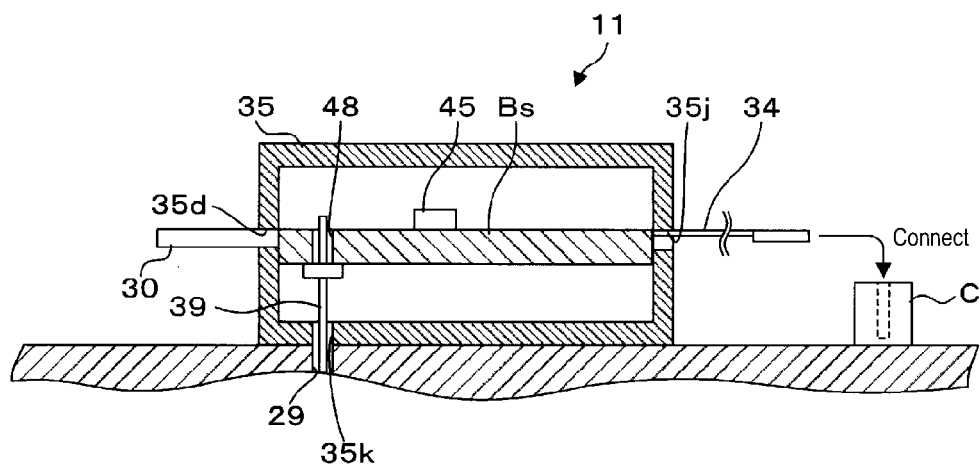
FIG. 26 is a cross-sectional view of a relay device according to a seventh embodiment.

FIG. 26 is a cross-sectional view of a relay device according to the seventh embodiment. As shown in FIG. 26, in the relay device 11, the plate-shaped apparatus connector 34 protrudes rearward from the rear end surface of the sub-substrate Bs. The apparatus connector 34 is flexible. The apparatus connector 34 is, for example, an FPC (Flexible Printed Circuit). One end of the apparatus connector 34 is installed on the sub-substrate Bs. A through hole 35j formed therethrough in the left-right direction is provided in the rear wall of the device box body 35. The apparatus connector 34 is inserted into the through hole 35j and is exposed to the rear side of the device box body 35. A plate-shaped terminal is connected to the other end of the apparatus connector 34.

In the relay apparatus 10, a cuboid-shaped connection tool C connected to the apparatus connector 34 is installed on the upper surface of the main substrate Bm. The upper surface of the connection tool C is provided with a recess that is recessed downward. The terminal of the apparatus connector 34 is inserted into the recess of the connection tool C. As a result, the apparatus connector 34 is connected to the connection tool C. Since the apparatus connector 34 is flexible, the connection between the connection tool C and the apparatus connector 34 can be easily realized.

The apparatus connector 34 is electrically connected to the conductive pattern provided on the sub-substrate Bs. The connection tool C is electrically connected to a conductive pattern provided on the main substrate Bm. Accordingly, by connecting the apparatus connector 34 to the connection tool C, the apparatus connector 34 connects the sub-substrate Bs and the main substrate Bm of the relay apparatus 10 to each other. The power supply circuit 24 of the relay apparatus 10 supplies power to the signal conversion units 32 and the relay unit 33 via the apparatus connector 34.

An insertion hole 48 formed in the up-down direction is provided on the front side of the sub-substrate Bs. The relay device 11 has a conductive rod 39 that is electrically conductive. The conductive rod 39 is a so-called lead pin. The conductive rod 39 is inserted into the insertion hole 48. The lower wall of the device box body 35 is provided with a through hole 35k formed therethrough in the up-down direction. The upper surface of the main substrate Bm of the relay apparatus 10 is provided with an insertion hole 29 into which the conductive rod 39 is inserted. The conductive rod 39 passes through the through hole 35k. In this state, the conductive rod 39 is inserted into the two insertion holes 29, 48. Inside the insertion hole 29, the conductive rod 39 is connected to the main substrate Bm by soldering. The conductive rod 39 is electrically connected to the first main conductor Gm1 provided on the main substrate Bm by soldering, for example.

Inside the insertion hole 48, the conductive rod 39 is connected to the sub-substrate Bs by soldering. The conductive rod 39 is electrically connected to the first sub-conductor Gs1 provided on the sub-substrate Bs, for example, by soldering. As described above, in the seventh embodiment, the conductive rod 39 electrically connects the first main conductor Gm1 and the first sub-conductor Gs1.

A plate-shaped communication line connector 30 protrudes frontward from the front end surface of the sub-substrate Bs. The communication line connector 30 is an edge connector. A plurality of conductive patterns are arranged on the upper surface of the communication line connector 30. The communication line connector 30 is inserted into the opening 35d of the device box body 35 and is exposed on the front side of the device box body 35. For example, multiple communication lines Lc are accommodated in a cable. The cable is provided with a recess. The communication line connector 30 is inserted into the recess of the cable. As a result, the communication line connector 30 is connected to the plurality of communication lines Lc.

The relay device 11 and the communication apparatus according to the seventh embodiment have the same effects as those of the sixth embodiment.

Modified Example of Seventh Embodiment

In the seventh embodiment, the shape of the apparatus connector 34 may also be a cuboid. In this case, the apparatus connector 34 has a recess. The connection tool C has a protruding portion. The protruding portion of the connector C is connected to the recess of the apparatus connector 34. The apparatus connector 34 may also be an edge connector. In this case, the apparatus connector 34 protrudes frontward from the front surface (end surface) of the sub-substrate Bs. The shape of the communication line connector 30 may also be similar to that of the sixth embodiment. Electrical connection between the first main conductor Gm1 and the first sub-conductor Gs1 may also be realized in the same manner as in the sixth embodiment.

Eighth Embodiment

In the sixth embodiment, the device box body 35 of the relay device 11 is fixed to the upper surface of the main substrate Bm of the relay apparatus 10 by soldering. However, the method for fixing the device box body 35 is not limited to the method using solder.

Hereinafter, differences between the eighth embodiment and the sixth embodiment will be described. Configurations other than those described later are the same as in the sixth embodiment. For this reason, components held in common with the sixth embodiment are denoted by the same reference numerals as those of the sixth embodiment, and description thereof is omitted.

Appearance of Relay Device 11

Figure 27:
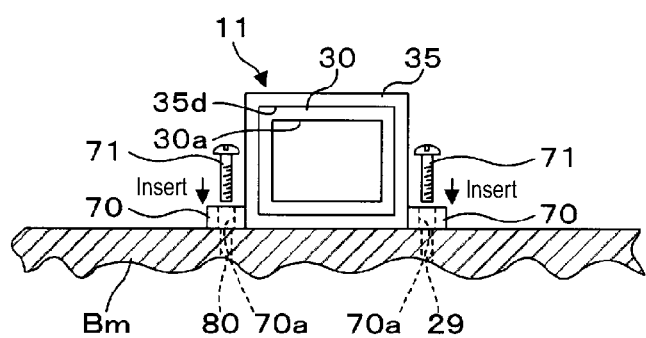
FIG. 27 is a front view of a relay device according to an eighth embodiment.

FIG. 27 is a front view of the relay device 11 according to the eighth embodiment. The relay device 11 in the eighth embodiment has two first protruding portions 70 instead of the two first protruding portions 38f. As shown in FIG. 27, one first protruding portion 70 protrudes leftward from the left surface of the device box body 35. The other first protruding portion 70 protrudes rightward from the right surface of the device box body 35. The first protruding portion 70 is provided with a through hole 70a formed therethrough in the up-down direction.

Two screw holes 80 are provided on the upper main surface of the main substrate Bm of the relay apparatus 10. Two conductive screws 71 that are electrically conductive are respectively passed through the two through holes 70a.

In this state, the two conductive screws 71 are respectively inserted into the two screw holes 80. Thereafter, the two conductive screws 71 are tightened. By tightening the two conductive screws 71, the device box body 35 is fixed to the upper surface of the main substrate Bm. When the device box body 35 is fixed, the top portions of the conductive screws 71 come into contact with the first protruding portions 70.

The first protruding portions 70 are electrically conductive. As stated in the description of the sixth embodiment, the device box body 35 is electrically conductive and is electrically connected to the first sub-conductor Gs1. Since the device box body 35 is provided with the first protruding portions 70, the device box body 35 is electrically connected to the first protruding portions 70. For this reason, the first protruding portions 70 are electrically connected to the first sub-conductor Gs1 via the device box body 35. When the device box body 35 is fixed, the first protruding portions 70 are in contact with the conductive screws 71, and therefore the conductive screws 71 are electrically connected to the first protruding portions 70. The conductive screws 71 are electrically connected to the first main conductor Gm1 inside the main substrate Bm. As a result, the first sub-conductor Gs1 is electrically connected to the first main conductor Gm1 via the device box body 35, the first protruding portions 70, and the conductive screws 71.

The relay device 11 and the communication apparatus according to the eighth embodiment have the same effects as in the sixth embodiment.

Modified Example of Sixth to Eighth Embodiments

In the eighth embodiment, second protruding portions configured similarly to the first protruding portions 70 may also be used instead of the second protruding portions 38r. In this case as well, screws are passed through holes of the second protruding portions, and the screws are inserted into screw holes of the main substrate Bm. Thereafter, the screws are tightened. In each of the sixth and seventh embodiments, the relay device 11 may also have the first protruding portions 70 instead of the first protruding portions 38f, as in the eighth embodiment. In this case as well, similarly to the eighth embodiment, the device box body 35 is fixed to the upper surface of the main substrate Bm using the conductive screws 71.

Ninth Embodiment

In the sixth embodiment, the method for achieving electrical connection between the second main conductor Gm2 and the second sub-conductor Gs2 is not limited to the method using the conductive rod 34p.

Hereinafter, differences between the ninth embodiment and the sixth embodiment will be described. Configurations other than those described later are the same as in the sixth embodiment. For this reason, components held in common with the sixth embodiment are denoted by the same reference numerals as those of the sixth embodiment, and description thereof is omitted.

Appearance of Relay Device 11

Figure 28:
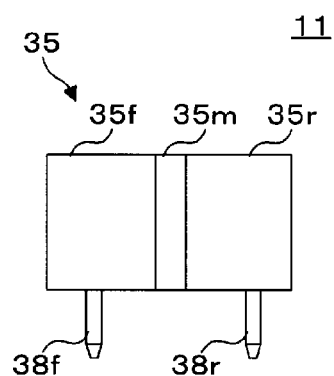
FIG. 28 is a side view of a relay device according to a ninth embodiment.

FIG. 28 is a side view of the relay device 11 according to the ninth embodiment. The device box body 35 has a first conductive portion 35f, a second conductive portion 35r, and a coupling portion 35m. The first conductive portion 35f and the second conductive portion 35r are arranged on the front side and the rear side, respectively. The coupling portion 35m couples the first conductive portion 35f and the second conductive portion 35r to each other. In the ninth embodiment, the shape of the device box body 35 is the same as in the first embodiment.

The first conductive portion 35f and the second conductive portion 35r are electrically conductive. The coupling portion 35m has insulating properties. The first conductive portion 35f is spaced apart from the second conductive portion 35r by the coupling portion 35m. Two first protruding portions 38f protrude downward from the lower surface of the first conductive portion 35f. Two second protruding portions 38r protrude downward from the lower surface of the second conductive portion 35r. The second protruding portions 38r are electrically conductive, similarly to the first protruding portions 38f.

The first conductive portion 35f of the device box body 35 is electrically connected to the first sub-conductor Gs1 via a conductor (not shown). The first protruding portions 38f are electrically connected to the first conductive portion 35f. When the device box body 35 is fixed to the main substrate Bm of the relay apparatus 10 by soldering, the first protruding portions 38f are electrically connected to the first main conductor Gm1. Accordingly, the first sub-conductor Gs1 is electrically connected to the first main conductor Gm1 via the first conductive portion 35f and the first protruding portions 38f.

Similarly, the second conductive portion 35r of the device box body 35 is electrically connected to the second sub-conductor Gs2 via a conductor (not shown). The second protruding portion 38r is electrically connected to the second conductive portion 35r. When the device box body 35 is fixed to the main substrate Bm of the relay apparatus 10 by soldering, the second protruding portion 38r is electrically connected to the second main conductor Gm2. Accordingly, the second sub-conductor Gs2 is electrically connected to the second main conductor Gm2 via the second conductive portion 35r and the second protruding portion 38r.

As described above, the first protruding portion 38f and the second protruding portion 38r can be electrically connected to the first main conductor Gm1 and the second main conductor Gm2, respectively. Note that in the relay device 11 according to the ninth embodiment, the conductive rod 34p connecting the second main conductor Gm2 and the second sub-conductor Gs2 to each other is not needed.

The relay device 11 and the communication apparatus in the ninth embodiment have the same effect as in the sixth embodiment.

Tenth Embodiment

In the sixth embodiment, the second inductor 22b or the resistor connects the first main conductor Gm1 and the second main conductor Gm2. However, a member other than the second inductor 22b and the resistor may also connect the first main conductor Gm1 and the second main conductor Gm2.

Hereinafter, differences between the tenth embodiment and the sixth embodiment will be described. Configurations other than those described later are the same as in the sixth embodiment. For this reason, components held in common with the sixth embodiment are denoted by the same reference numerals as those of the sixth embodiment, and description thereof is omitted.

Configuration of Relay Apparatus 10

Figure 29:
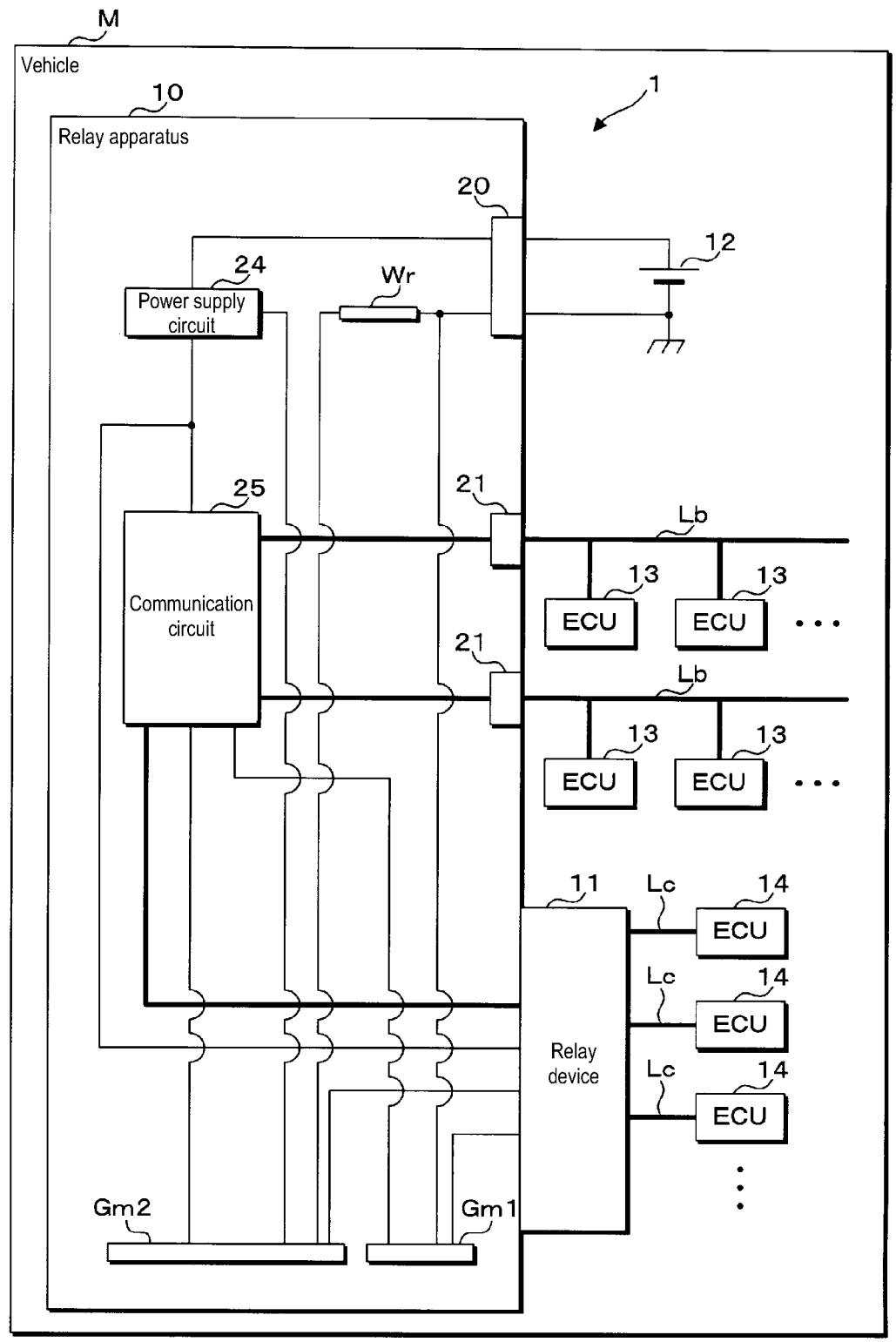
FIG. 29 is a block diagram showing a configuration of a main part of a relay apparatus according to a tenth embodiment.

FIG. 29 is a block diagram showing a configuration of a main part of the relay apparatus 10 according to the tenth embodiment. The relay apparatus 10 according to the tenth embodiment has components other than the common mode choke coil 23 among the components of the relay apparatus 10 according to the sixth embodiment. Accordingly, the relay apparatus 10 has the first main conductor Gm1 and the second main conductor Gm2. The first main conductor Gm1 and the second main conductor Gm2 are respectively connected to the first sub-conductor Gs1 and the second sub-conductor Gs2 of the relay device 11. The relay apparatus 10 according to the tenth embodiment has a second conductive wire Wr.

The power supply circuit 24 is directly connected to the power supply connector 20. One end of the second conductive wire Wr is connected to the power supply connector 20 and the first main conductor Gm1. The other end of the second conductor Wr is connected to the second main conductive wire Gm2. In this manner, the first main conductor Gm1 and the second main conductor Gm2 are connected by the second conductive wire Wr.

Electric current flows from the positive electrode of the DC power supply 12 through the power supply circuit 24, the second main conductor Gm2, and the second conductive wire Wr in the stated order, and returns to the negative electrode of the DC power supply 12. The DC power supply 12 applies to the power supply circuit 24 a voltage whose reference electric potential is the electric potential of the second main conductor Gm2. The power supply circuit 24 steps down the voltage applied from the DC power supply 12 to a constant voltage such as 5 V or 3.3 V. The power supply circuit 24 applies to the relay device 11 and the communication circuit 25 a constant voltage generated by stepping down the voltage, as in the sixth embodiment. As a result, power is supplied to the relay device 11 and the communication circuit 25. The reference electric potential of the constant voltage is the electric potential of the second main conductor Gm2. As in the sixth embodiment, noise entering the first sub-conductor Gs1 of the relay device 11 is output to the outside of the relay apparatus 10 via the first main conductor Gm1 and the power supply connector 20.

Figure 30:
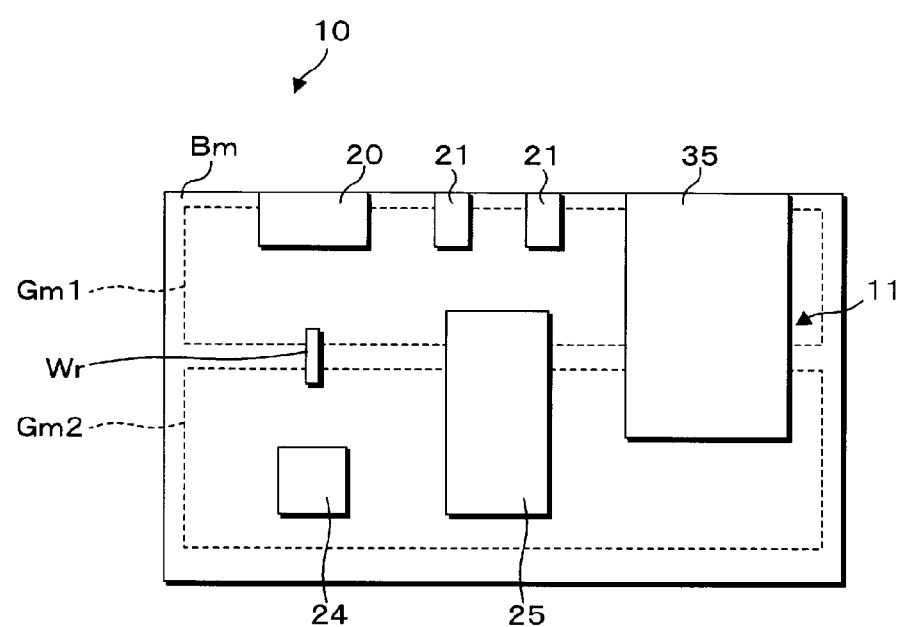
FIG. 30 is an explanatory diagram of arrangement of a second conductive wire.

FIG. 30 is an explanatory diagram of arrangement of the second conductive wire Wr. As shown in FIG. 30, the second conductive wire Wr is arranged on the main surface of the main substrate Bm. One end of the second conductive wire Wr is located above the first main conductor Gm1 and is connected to one point of the first main conductor Gm1. The other end of the second conductive wire Wr is located above the second main conductor Gm2 and is connected to one point of the second main conductor Gm2.

The second conductive wire Wr has a resistance component. Since the shape of the second conductive wire Wr is linear, the cross-sectional area of the second conductive wire Wr is small. Accordingly, the resistance value of the resistance component of the second conductive wire Wr is large. Accordingly, it is difficult for noise to pass through the second conductive wire Wr. Even if the electric potential of the first main conductor Gm1 fluctuates due to noise entering the first main conductor Gm1, there is little influence on the voltage or electric signal whose reference electric potential is the electric potential of the second main conductor Gm2. Similarly, even if the electric potential of the second main conductor Gm2 fluctuates due to noise entering the second main conductor Gm2, there is little influence on the voltage or signal whose reference electric potential is the electric potential of the first main conductor Gm1.

The communication apparatus according to the tenth embodiment has the same effect as the sixth embodiment. As stated in the description of the sixth embodiment, the communication apparatus includes the relay apparatus 10 and the relay device 11.

Modified Example of First to Fifth Embodiments

The relay apparatus 10 according to each of the first to fourth embodiments may also have a second conductive wire Wr instead of the common mode choke coil 23, as in the tenth embodiment. In this case, the power supply circuit 24 and the second conductive wire Wr are connected in the same manner as in the tenth embodiment. The power supply circuit 24 operates in the same manner as in the tenth embodiment. Similarly, the power supply apparatus 15 according to the fifth embodiment may also have a second conductive wire Wr instead of the common mode choke coil 23, as in the sixth embodiment. In this case, the power supply circuit 24 and the second conductive wire Wr are connected in the same manner as in the sixth embodiment. The power supply circuit 24 supplies power to the relay device 11 as in the tenth embodiment.

Modified Example of Tenth Embodiment

The configuration of relay device 11 is not limited to the configuration of the sixth embodiment. The relay device 11 of the tenth embodiment may also be configured similarly to one of the relay devices 11 of the seventh to ninth embodiments.

Eleventh Embodiment

In the sixth embodiment, the negative electrode of the DC power supply 12 is connected to the first main conductor Gm1 via the power supply connector 20. However, the negative electrode of the DC power supply 12 need not be connected to the first main conductor Gm1.

Hereinafter, differences between the eleventh embodiment and the sixth embodiment will be described. Configurations other than those described later are the same as in the sixth embodiment. For this reason, components held in common with the sixth embodiment are denoted by the same reference numerals as those of the sixth embodiment, and description thereof is omitted.

Configuration of Relay Apparatus 10

Figure 31:
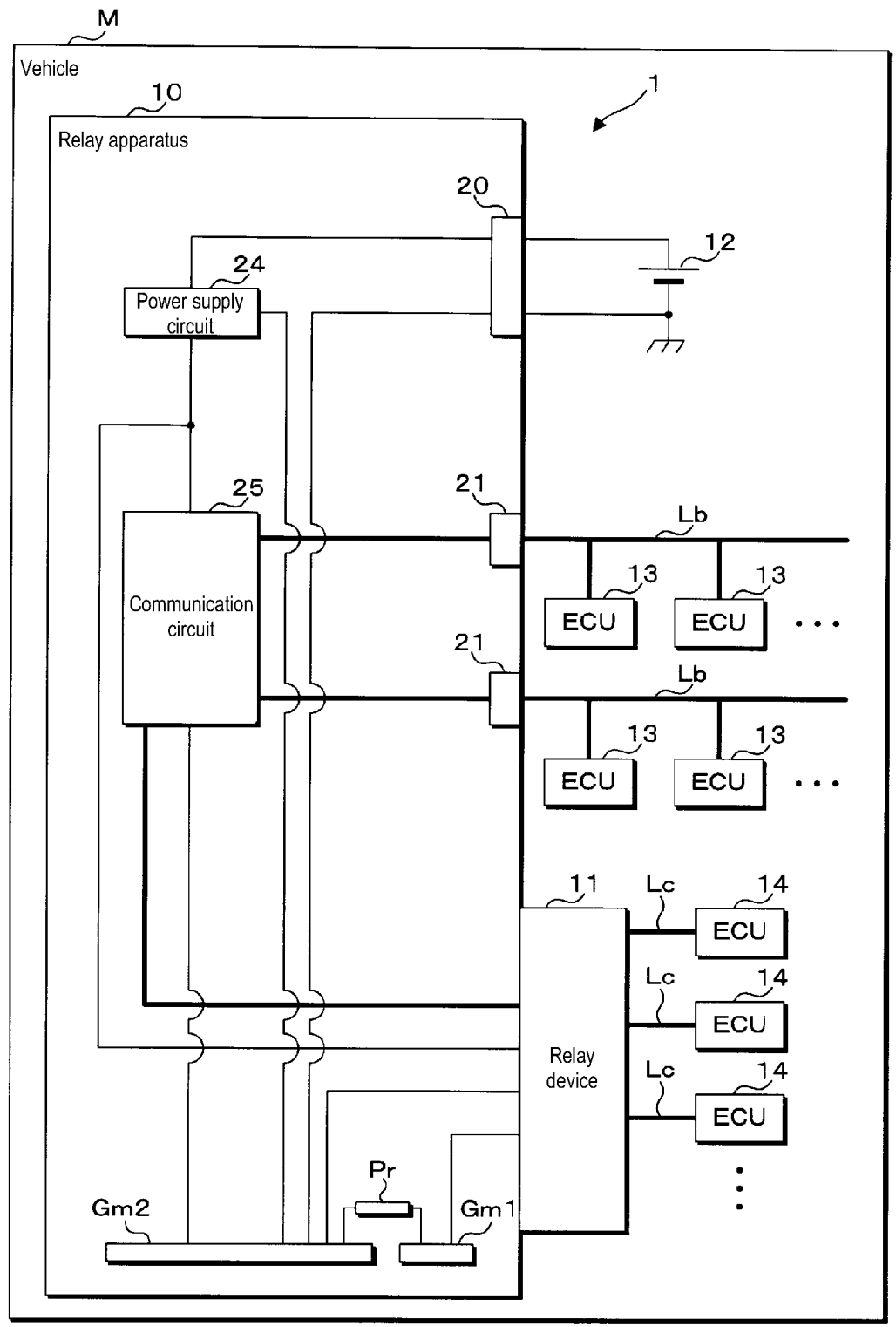
FIG. 31 is a block diagram showing a configuration of a main part of a relay apparatus according to an eleventh embodiment.

FIG. 31 is a block diagram showing a configuration of a main part of the relay apparatus 10 according to the eleventh embodiment. The relay apparatus 10 according to the eleventh embodiment has components other than the common mode choke coil 23 among the components of the relay apparatus 10 according to the sixth embodiment. Accordingly, the relay apparatus 10 has the first main conductor Gm1 and the second main conductor Gm2. The first main conductor Gm1 and the second main conductor Gm2 are respectively connected to the first sub-conductor Gs1 and the second sub-conductor Gs2 of the relay device 11, respectively. The relay apparatus 10 according to the eleventh embodiment further has a connection part Pr.

The power supply circuit 24 is directly connected to the power supply connector 20. The power supply connector 20 is further connected to the second main conductor Gm2. The power supply connector 20 is not connected to the first main conductor Gm1. The connection part Pr is an inductor, a resistor, a conductive wire, or the like. The conductive wire has a resistance component. One end of the connection part Pr is connected to the first main conductor Gm1. The other end of the connection part Pr is connected to the second main conductor Gm2. Accordingly, the first main conductor Gm1 and the second main conductor Gm2 are connected by the connection part Pr.

As described above, the connection part Pr is an inductor, a resistor, a conductive wire, or the like. Accordingly, as in the sixth and tenth embodiments, even if the electric potential of the first main conductor Gm1 fluctuates due to noise entering the first main conductor Gm1, there is little influence on the voltage or the electrical signal whose reference electric potential is the electric potential of the second main conductor Gm2. Similarly, even if the electric potential of the second main conductor Gm2 fluctuates due to noise entering the second main conductor Gm2, there is little influence on the voltage or signal whose reference electric potential is the electric potential of the first main conductor Gm1.

Figure 32:
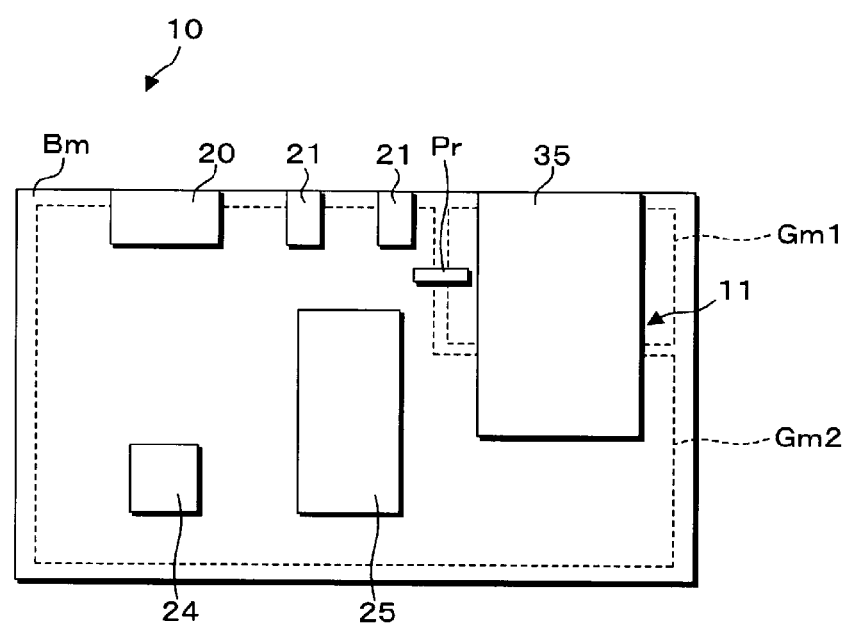
FIG. 32 is an explanatory diagram of arrangement of a connection part.

FIG. 32 is an explanatory diagram of arrangement of the connection part Pr. As shown in FIG. 32, the connection part Pr is arranged on the main surface of the main substrate Bm. One end of the connection part Pr is located above the first main conductor Gm1 and is connected to one point of the first main conductor Gm1. The other end of the connection part Pr is located above the second main conductor Gm2 and is connected to one point of the second main conductor Gm2.

As shown in FIG. 32, in the relay apparatus 10, the first main conductor Gm1 is not connected to the power supply connector 20. Accordingly, it is not necessary to arrange the first main conductor Gm1 near the power supply connector 20. Accordingly, as shown in FIG. 32, a plate-shaped conductor having a main surface with a small surface area can be used as the first main conductor Gm1. When a plate-shaped conductor having a main surface with a small surface area is used as the first main conductor Gm1, a plate-shaped conductor having a main surface with a large surface area can be used as the second main conductor Gm2. In this case, since the resistance value of the second main conductor Gm2 is small, the electric potential of the second main conductor Gm2 is stable.

The communication apparatus according to the eleventh embodiment exhibits the same effects as those of the sixth embodiment.

Modified Example of First to Fifth Embodiments

The relay apparatuses 10 according to each of the first to fourth embodiments may also have the connection part Pr as in the eleventh embodiment, without having the common mode choke coil 23. In this case, the power supply circuit 24 and the connection part Pr are connected in the same manner as in the eleventh embodiment. The power supply circuit 24 operates in the same manner as in the eleventh embodiment. Similarly, the power supply apparatus 15 according to the fifth embodiment may also have the connection part Pr as in the eleventh embodiment, without having the common mode choke coil 23. In this case, the power supply circuit 24 and the connection part Pr are connected in the same manner as in the eleventh embodiment. The power supply circuit 24 supplies power to the relay device 11 as in the eleventh embodiment.

Modified Example of Eleventh Embodiment

The configuration of the relay device 11 is not limited to the configuration of the sixth embodiment. The relay device 11 of the tenth embodiment may also be configured similarly to one of the relay devices 11 of the seventh to ninth embodiments.

Twelfth Embodiment

In the sixth embodiment, the first sub-conductor Gs1 of the relay device 11 is connected to the first main conductor Gm1 of the relay apparatus 10. However, the first sub-conductor Gs1 need not be connected to the first main conductor Gm1.

Hereinafter, differences between the twelfth embodiment and the sixth embodiment will be described. Configurations other than those described later are the same as in the sixth embodiment. For this reason, components that are held in common with the first embodiment are denoted by the same reference numerals as in the first embodiment, and description thereof is omitted.

Configuration of Relay Device 11

Figure 33:
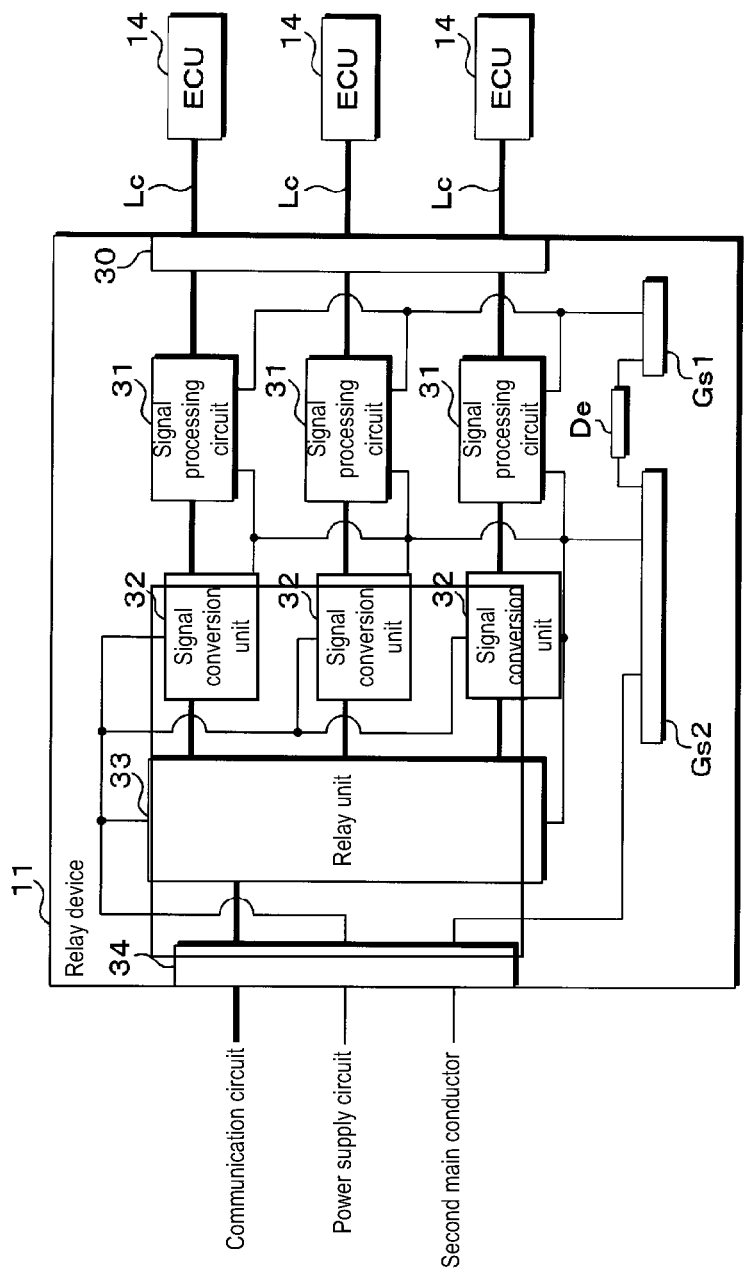
FIG. 33 is a block diagram showing a configuration of a main part of a relay device according to a twelfth embodiment.
Figure 34:
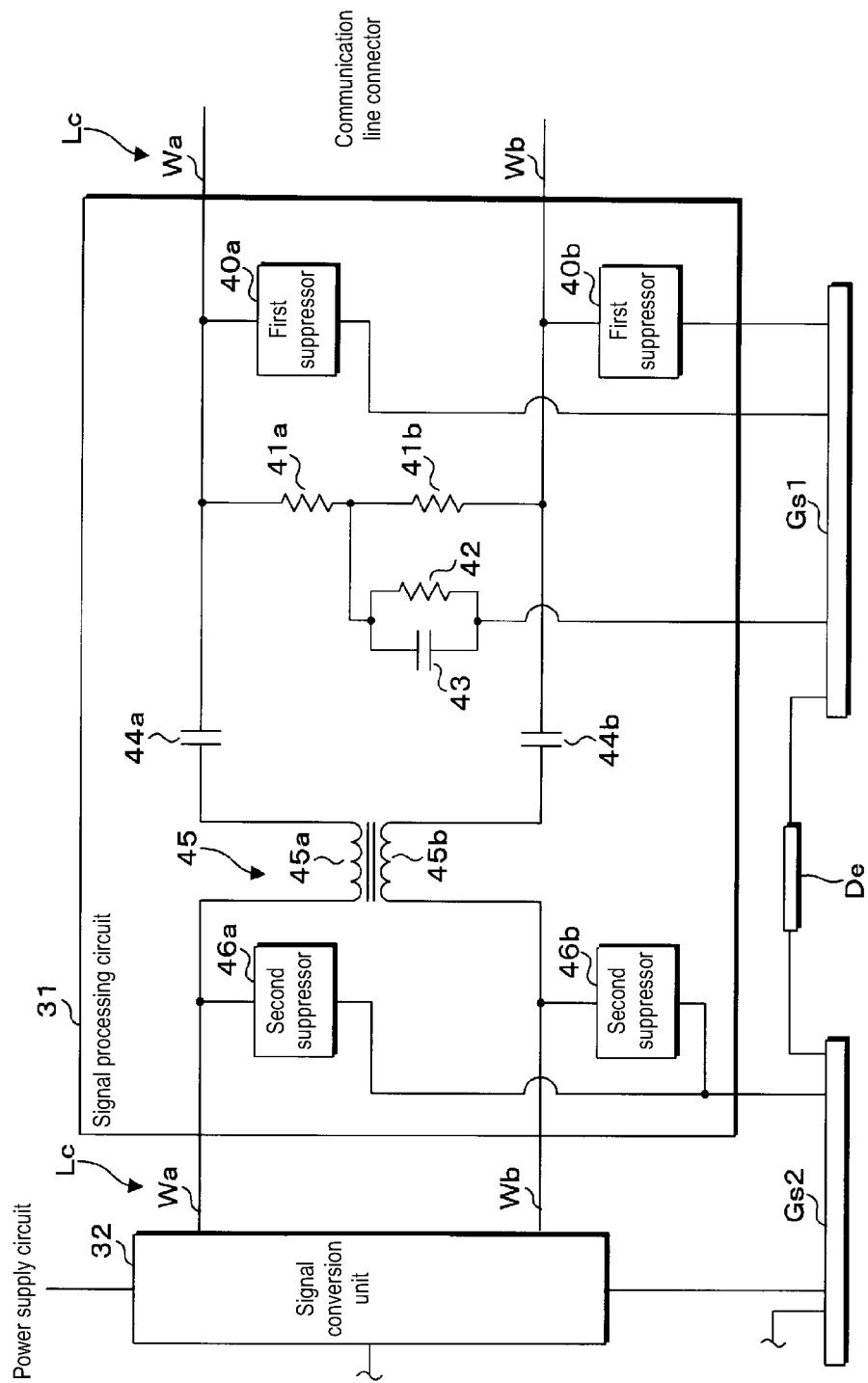
FIG. 34 is a circuit diagram of a signal processing circuit.

FIG. 33 is a block diagram showing a configuration of a main part of the relay device 11 according to the twelfth embodiment. FIG. 34 is a circuit diagram of the signal processing circuit 31. The relay device 11 has a conductor connection element De. The conductor connection element De is an inductor, a resistor, a conductive wire, or the like. The conductive wire has a resistance component. As shown in FIGS. 33 and 34, one end of the conductor connection element De is connected to the first sub-conductor Gs1. The other end of the conductor connection element De is connected to the second sub-conductor Gs2. Accordingly, the conductor connection element De is connected between the first sub-conductor Gs1 and the second sub-conductor Gs2.

Figure 35:
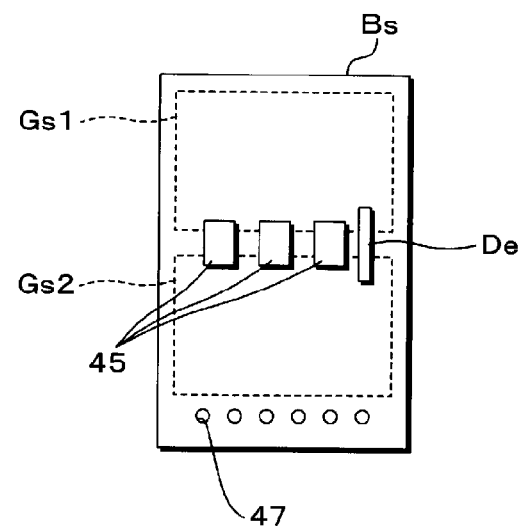
FIG. 35 is a plan view of a sub-substrate.

FIG. 35 is a plan view of the sub-substrate Bs. FIG. 35 shows the upper surface of the sub-substrate Bs. As stated in the description of the sixth embodiment, a plurality of insertion holes 47 are provided on the rear side of the sub-substrate Bs. FIG. 35 shows an example in which the number of insertion holes 47 is six. A plurality of insertion holes 47 are arranged side by side in the left-right direction. A conductive rod 34$p$ is inserted into each insertion hole 47. The first sub-conductor Gs1 and the second sub-conductor Gs2 are arranged inside the sub-substrate Bs.

As shown in FIGS. 24 and 35, each of the first sub-conductor Gs1 and the second sub-conductor Gs2 has a rectangular plate shape. The first sub-conductor Gs1 is arranged in front of the second sub-conductor Gs2. Common mode choke coils 45 and the conductor connection element De are arranged on the upper main surface of the sub-substrate Bs. FIG. 35 shows an example in which the number of signal processing circuits 31 is three and the number of signal conversion units 32 is three. For this reason, three common mode choke coils 45 are arranged.

The common mode choke coils 45 are located above the first sub-conductor Gs1 and the second sub-conductor Gs2. One end of the conductor connection element De is located above the first sub-conductor Gs1. One end of the conductor connection element De is connected to the first sub-conductor Gs1 using a through hole, for example. The other end of the conductor connection element De is located above the second sub-conductor Gs2. The other end of the conductor connection element De is connected to the second sub-conductor Gs2 by a through hole, for example.

In the twelfth embodiment, the first sub-conductor Gs1 is not electrically connected to the first main conductor Gm1. In the sixth embodiment, the first sub-conductor Gs1 is electrically connected to the first main conductor Gm1 via the device box body 35 and the first protruding portions 38$f$.

In the twelfth embodiment, as a first example, both or one of the device box body 35 and the first protruding portions 38f has insulating properties. As a second example, the connection between the first protruding portions 38f and the first main conductor Gm1 is not realized.

The conductor connection element De is connected between the first sub-conductor Gs1 and the second sub-conductor Gs2. For this reason, even if the electric potential of the first sub-conductor Gs1 fluctuates due to noise entering the first sub-conductor Gs1, there is little influence on the voltage or signal whose reference electric potential is the electric potential of the second sub-conductor Gs2. Similarly, even if the electric potential of the second sub-conductor Gs2 fluctuates due to noise entering the second sub-conductor Gs2, there is little influence on the voltage or signal whose reference electric potential is the electric potential of the first sub-conductor Gs1.

The relay device 11 and the communication apparatus according to the twelfth embodiment have the same effect as in the sixth embodiment.

Modified Example of Twelfth Embodiment

In the twelfth embodiment, as in the sixth embodiment, the first sub-conductor Gs1 may also be electrically connected to the first main conductor Gm1.

Modified Example of First to Fifth Embodiments and Seventh to Eleventh Embodiments In each of the first to fifth embodiments and the seventh to eleventh embodiments, as in the twelfth embodiment, the conductor connection element De may also be connected between the first sub-conductor Gs1 and the second sub-conductor Gs2. In this case, there is no problem even if the first sub-conductor Gs1 is not electrically connected to the first main conductor Gm1.

Thirteenth Embodiment

In the twelfth embodiment, the relay apparatus 10 need not have the first main conductor Gm1. Hereinafter, differences between the thirteenth embodiment and the twelfth embodiment will be described. Configurations other than those described later are the same as those of the twelfth embodiment. For this reason, components held in common with the twelfth embodiment are denoted by the same reference numerals as in the twelfth embodiment, and description thereof is omitted.

Configuration of Relay Apparatus 10

Figure 36:
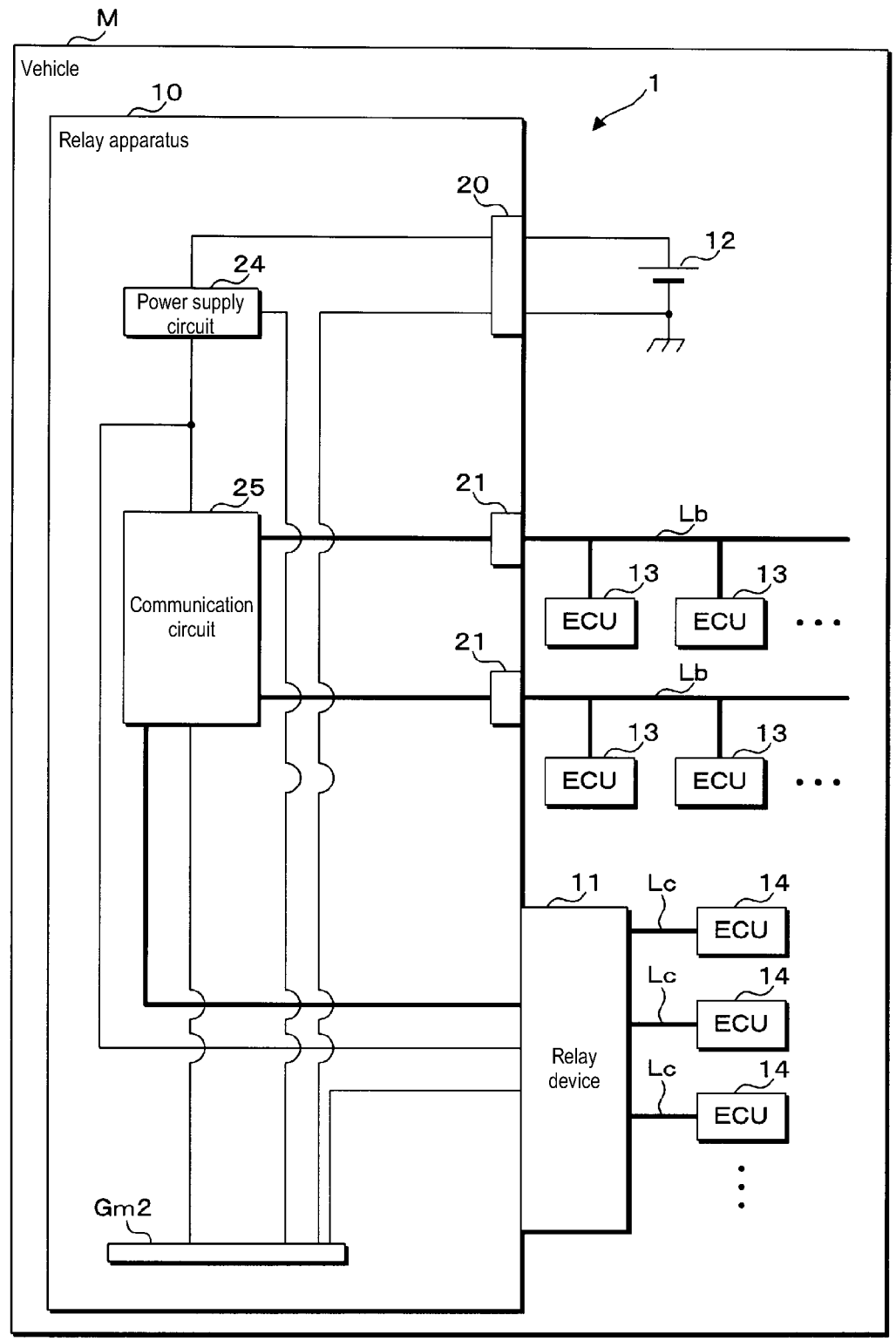
FIG. 36 is a block diagram showing a configuration of a main part of a relay apparatus according to a thirteenth embodiment.

FIG. 36 is a block diagram showing a configuration of a main part of the relay apparatus 10 according to the thirteenth embodiment. The relay apparatus 10 according to the thirteenth embodiment has components other than the common mode choke coil 23 and the first main conductor Gm1 among the components included in the relay apparatus 10 according to the thirteenth embodiment.

The power supply circuit 24 is directly connected to the power supply connector 20. The power supply connector 20 is further connected to the second main conductor Gm2. Since the relay apparatus 10 is not provided with the first main conductor Gm1, the power supply connector 20 and the communication circuit 25 are not connected to the first main conductor Gm1.

In the thirteenth embodiment, the communication circuit 25 does not process electrical signals using the electric potential of the first main conductor Gm1 as the reference electric potential. Accordingly, when the communication circuit 25 receives a differential signal via the communication bus Lb, the communication circuit 25 converts the received differential signal into a voltage signal whose reference electric potential is the electric potential of the second main conductor Gm2. The communication circuit 25 acquires the data included in the converted voltage signal.

Figure 37:
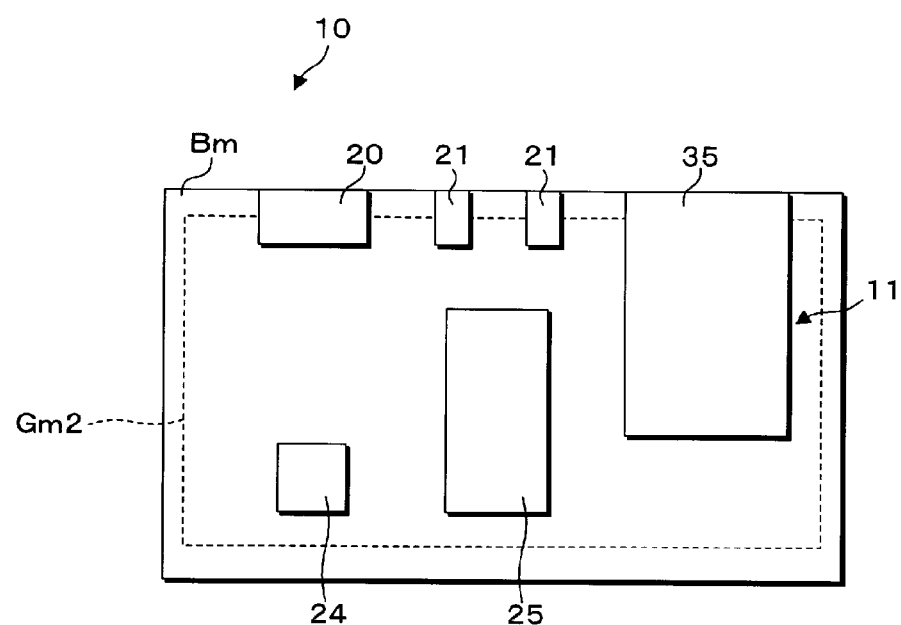
FIG. 37 is an explanatory diagram of arrangement of a second main conductive wire.

FIG. 37 is an explanatory diagram of arrangement of the second main conductors Gm2. Since the relay apparatus 10 is not provided with the first main conductor Gm1, a plate-shaped conductor having a main surface with a large surface area can be used as the second main conductor Gm2, as shown in FIG. 37. In this case, since the resistance value of the second main conductor Gm2 is small, the electric potential of the second main conductor Gm2 is stable.

The relay device 11 according to the thirteenth embodiment has the same effects as the relay device 11 of the twelfth embodiment except for the connection effect obtained by connecting the first main conductor Gm1 to the first sub-conductor Gs1. The communication apparatus according to the thirteenth embodiment has the same effects as the communication apparatus according to the twelfth embodiment, except for the connection effect and the effect of the common mode choke coil 23.

Modified Example of First to Third Embodiments

In the seventh, eighth, tenth, and eleventh embodiments, the device box body 35 may be configured similarly to the ninth embodiment. Here, in the eighth embodiment, the first protruding portions 70 protrude from the first conductive portion 35f. The second protruding portions of the eighth embodiment are electrically conductive and protrude from the second conductive portion 35r. In this case, conductive screws are passed through the through holes of the second protruding portions. The second sub-conductor Gs2 is electrically connected to the second main conductor Gm2 via the second conductive portion 35r, the second protruding portions, and the screws. In the twelfth embodiment, if the first main conductor Gm1 and the second main conductor Gm2 are to be respectively connected to the first sub-conductor Gs1 and the second sub-conductor Gs2, the device box body 35 may also be configured in the same manner as in the ninth embodiment. In the fifth embodiment, the relay device 11 may also be configured similarly to the sixth to thirteenth embodiments. In this case, the power supply apparatus 15 does not have the device connector 22, as in the sixth embodiment.

The accommodation box H according to the fourth embodiment may also have a first conductive portion, a second conductive portion, and a coupling portion, similarly to the device connector 22 in the ninth embodiment. In this case, the first main conductor Gm1 is electrically connected to the first sub-conductor Gs1 via the apparatus plating 51, the apparatus screws Fm1, the first conductive portion of the accommodation box H, the device screws Fs1, and the device plating 61. Similarly to the apparatus screws Fm1 and the device screws Fs1, by tightening the apparatus screws Fm2 and the device screws Fs2, electrical connection can be realized between the second main conductor Gm2 and the second sub-conductor Gs2 via the apparatus plating 51, the apparatus screws Fm2, the second conductive portion of the accommodation box H, the device screws Fs2, and the device plating 61.

In the first to thirteenth embodiments, instead of the ECU 14, another device having a communication function, such as a camera, may be used. The ECU 14 and another device different from the ECU 14 may also be connected to the relay device 11. The communication system 1 in each of the first to fourth and sixth to thirteenth embodiments may also further include the relay device 11, a plurality of apparatuses (ECUs 14), and a power supply apparatus 15. In this case, for example, two relay devices 11 are connected by the communication line Lc. A common DC power supply 12 supplies power to the relay apparatus 10 and the power supply apparatus 15. In the first to twelfth embodiments, the first main conductor Gm1 may also be connected to the first sub-conductor Gs1 via the apparatus connector 34. In the configuration in which the apparatus connector 34 has a plurality of conductive rods 34*p*, the first main conductor Gm1 is connected to the first sub-conductor Gs1 via one conductive rod 34*p*.

In the relay devices 11 according to the first to thirteenth embodiments, circuit elements may also be arranged on both main surfaces of the sub-substrate Bs. In the first to thirteenth embodiments, the number of first protruding portions 38*f* or the number of first protruding portions 70 is not limited to two, and may be one or three or more. Also, in the first to thirteenth embodiments, the number of second protruding portions 38*r* or the number of second protruding portions configured in the same manner as the first protruding portions 70 is not limited to two, and may be one or three or more.

In the first to thirteenth embodiments, the location where the first sub-conductor Gs1 and the second sub-conductor Gs2 are arranged is not limited to the inside of the sub-substrate Bs, and may also be the main surface or the end surface of the sub-substrate Bs. Similarly, the location where the first main conductor Gm1 and the second main conductor Gm2 are arranged is not limited to the inside of the main substrate Bm, and may also be the main surface or the end surface of the main substrate Bm.

In the first to thirteenth embodiments, the communication line Lc connected to the relay device 11 may also be a communication bus. In this case, multiple ECUs 14 are connected to the communication line Lc. Communication via the communication line Lc is performed, for example, in the same manner as communication via the communication bus Lb. Communication via the communication line Lc is, for example, communication according to the CAN communication protocol.

The technical features (constituent elements) described in the first to thirteenth embodiments can be combined with each other, and new technical features can be formed by combining them.

The disclosed first to thirteenth embodiments are to be considered illustrative in all respects and not restrictive. The scope of the present disclosure is indicated not by the meaning described above but by the claims, and all modifications within the meaning and range of equivalency to the claims are intended to be encompassed therein.

The invention claimed is:

1. A communication device configured to be attached to an in-vehicle apparatus and receive a differential signal represented by a voltage difference between two electrical signals respectively propagating through two conductive wires, the communication device comprising:
    a noise removal circuit configured to remove noise from the two electrical signals using an electric potential of a first conductor as a reference electric potential;
    a signal conversion unit configured to convert a differential signal represented by a voltage difference between the two electrical signals from which the noise removal circuit has removed noise, into a voltage signal represented by a voltage whose reference electric potential is an electric potential of a second conductor; and
    an apparatus connector configured to be connected to a power supply apparatus for supplying power,
    wherein the power supply apparatus supplies power to the signal conversion unit by applying a voltage whose reference electric potential is the electric potential of the second conductor to the signal conversion unit via the apparatus connector.

2. The communication device according to claim 1, wherein the differential signal is a communication signal conforming to an Ethernet communication protocol, a communication signal using LVDS (Low Voltage Differential Signaling), or a communication signal conforming to USB (Universal Serial Bus).

3. The communication device according to claim 1 further including,
    a conductor connection element configured to be connected between the first conductor and the second conductor,
    wherein the conductor connection element is an inductor, a resistor, or a conductive wire.

4. The communication device according to claim 1, further including,
    a substrate on which the first conductor and the second conductor are arranged;
    a box body that has an open surface and is configured to accommodate the substrate inserted through the open surface; and
    a rail that is provided in the box body and extends from the open surface toward a bottom surface of the box body.

5. The communication device according to claim 1, further including,
    a substrate on which the first conductor and the second conductor are arranged,
    wherein the apparatus connector is arranged at an edge portion on one side of the substrate, and
    the first conductor and the second conductor are arranged side by side along one side of the edge portion where the apparatus connector is arranged.

6. The communication device according to claim 1, further including,
    a substrate on which the first conductor and the second conductor are arranged,
    wherein the substrate has a circuit surface on which a circuit element is arranged,
    the apparatus connector is arranged on the substrate and protrudes in a direction perpendicular to the circuit surface, and
    the power supply apparatus is connected at a leading end of the apparatus connector.

7. The communication device according to claim 1, further including,
    a substrate on which the first conductor and the second conductor are arranged;
    a box body that is electrically conductive and is configured to accommodate the substrate; and
    a protruding portion that protrudes outward from the box body and is used for fixing the box body,
    wherein the protruding portion is electrically conductive and is electrically connected to the first conductor via the box body.

8. The communication device according to claim 7, wherein the protruding portion is provided with a through hole through which an electrically conductive screw is passed, the box body is fixed by tightening the screw, and
when the box body is fixed, the screw is electrically connected to the protruding portion.

9. The communication device according to claim 7, further including,
a second protruding portion that is electrically conductive, protrudes outward from the box body, and is used for fixing the box,
wherein the box body includes:
a first conductive portion that is electrically conductive and is electrically connected to the first conductor;
a second conductive portion that is electrically conductive and is electrically connected to the second conductor; and
a coupling portion that has insulating properties and couples the first conductive portion and the second conductive portion to each other,
the protruding portion protrudes from the first conductive portion, and
the second protruding portion protrudes from the second conductive portion.

10. The communication device according to claim 1, further including,
a substrate on which the first conductor and the second conductor are arranged; and
a box body that is electrically conductive and is configured to accommodate the substrate,
wherein the substrate is provided with a second through hole through which a second screw that is electrically conductive is passed,
the box body is provided with a screw hole into which the second screw passed through the second through hole is inserted, and
when the second screw is tightened in the screw hole, the first conductor is electrically connected to the box body via the second screw.

11. The communication device according to claim 1, further including,
a substrate on which the first conductor and the second conductor are arranged,
wherein the apparatus connector has a conductive rod that is electrically conductive, and
the substrate is provided with an insertion hole into which the conductive rod is inserted.

12. A communication apparatus comprising:
a communication device configured to receive a differential signal represented by a voltage difference between two electrical signals respectively propagating through two conductive wires; and
a vehicle power supply apparatus to which the communication device is to be attached and that is configured to supply power to the communication device,
wherein the communication device includes:
a noise removal circuit configured to remove noise from the two electrical signals using an electric potential of a first conductor as a reference electric potential;
a signal conversion unit configured to convert a differential signal represented by a voltage difference between the two electrical signals from which the noise removal circuit has removed noise, into a voltage signal represented by a voltage whose reference electric potential is an electric potential of a second conductor; and
an apparatus connector configured to be connected to the power supply apparatus, and
the power supply apparatus has a power supply circuit configured to supply power to the signal conversion unit by applying a voltage whose reference electric potential is the electric potential of the second conductor to the signal conversion unit via the apparatus connector.

13. The communication apparatus according to claim 12, wherein the power supply apparatus has a power supply conductor,
the power supply circuit of the power supply apparatus applies a voltage whose reference electric potential is the electric potential of the power supply conductor, to the signal conversion unit via the apparatus connector, and
the second conductor is connected to the power supply conductor via the apparatus connector.

14. The communication apparatus according to claim 13, wherein the power supply apparatus includes:
a second power supply conductor; and
a voltage conversion unit configured to convert a voltage whose reference electric potential is the electric potential of the second power supply conductor, into a voltage whose reference electric potential is the electric potential of the power supply conductor, and
the first conductor is connected to the second power supply conductor via the apparatus connector.

15. The communication apparatus according to claim 12, wherein the power supply apparatus has a power supply conductor and a second power supply conductor,
the power supply conductor and the second power supply conductor are respectively connected to the second conductor and the first conductor, and
the power supply conductor and the second power supply conductor are connected by an inductor, a resistor, or a second conductive wire.

16. The communication apparatus according to claim 12, wherein the communication device transmits data included in the voltage signal converted by the signal conversion unit to the power supply apparatus via the apparatus connector.

* * * * *